United States Patent
Takama

(10) Patent No.: US 11,928,831 B2
(45) Date of Patent: Mar. 12, 2024

(54) INFORMATION PROCESSING APPARATUS, SHAPE DATA GENERATION METHOD, AND STORAGE MEDIUM

(71) Applicant: CANON KABUSHIKI KAISHA, Tokyo (JP)

(72) Inventor: Yasufumi Takama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 17/024,382

(22) Filed: Sep. 17, 2020

(65) Prior Publication Data

US 2021/0090278 A1    Mar. 25, 2021

(30) Foreign Application Priority Data

Sep. 20, 2019  (JP) .................................. 2019-172189
Sep. 20, 2019  (JP) .................................. 2019-172190

(51) Int. Cl.
  *G06T 7/55*  (2017.01)
  *H04N 7/18*  (2006.01)
  *H04N 23/90*  (2023.01)

(52) U.S. Cl.
  CPC .................. *G06T 7/55* (2017.01); *H04N 7/18* (2013.01); *H04N 23/90* (2023.01);
  (Continued)

(58) Field of Classification Search
  CPC ............. G06T 7/55; G06T 2207/20021; G06T 2207/30196; G06T 2207/30224; G06T 7/564; H04N 5/247; H04N 7/18
  (Continued)

(56) References Cited

U.S. PATENT DOCUMENTS

| | | |
|---|---|---|
| 2007/0136034 A1 | 6/2007 | Kim |
| 2008/0079717 A1* | 4/2008 | Arita ....................... G16Z 99/00 345/419 |
| 2010/0013927 A1* | 1/2010 | Nixon .................... G01C 11/06 348/E7.085 |

(Continued)

FOREIGN PATENT DOCUMENTS

| | | |
|---|---|---|
| JP | 2008191072 A | 8/2008 |
| JP | 2015045920 A | 3/2015 |

(Continued)

OTHER PUBLICATIONS

Charles R. Dyer, Volumetric Scene Reconstruction from Multiple Views, Foundations of Image Understanding, L. S. Davis, ed., 2001, pp. 469-488, Kluwer, Boston, XP002325058.

(Continued)

*Primary Examiner* — Stephen P Coleman
(74) *Attorney, Agent, or Firm* — Canon U.S.A., Inc. IP Division

(57) ABSTRACT

An information processing apparatus generates shape data on an object included in a first partial space based on one or more captured images obtained from one or more of a plurality of imaging apparatuses and a first parameter corresponding to the first partial space, the first partial space being included in a plurality of partial spaces in an imaging space which is an image capturing target for the plurality of imaging apparatuses, and generates shape data on an object included in a second partial space based on one or more captured images obtained from one or more of the plurality of imaging apparatuses and a second parameter corresponding to the second partial space, the second partial space being included in the plurality of partial spaces, the second parameter being different from the first parameter.

18 Claims, 16 Drawing Sheets

(52) U.S. Cl.
CPC ........... *G06T 2207/20021* (2013.01); *G06T 2207/30196* (2013.01); *G06T 2207/30224* (2013.01)

(58) Field of Classification Search
USPC ..................................................... 382/103
See application file for complete search history.

(56) References Cited

U.S. PATENT DOCUMENTS

| | | | | |
|---|---|---|---|---|
| 2016/0054806 | A1* | 2/2016 | Kosaka | G06V 40/28 345/156 |
| 2017/0064210 | A1* | 3/2017 | Ohno | H04N 5/247 |
| 2018/0017379 | A1* | 1/2018 | Nakagawa | G06T 7/593 |
| 2018/0098047 | A1 | 4/2018 | Itakura et al. | |
| 2018/0367709 | A1* | 12/2018 | Takama | H04N 5/2224 |
| 2019/0335162 | A1* | 10/2019 | Kawahara | H04N 13/282 |

FOREIGN PATENT DOCUMENTS

| | | |
|---|---|---|
| JP | 2018067106 A | 4/2018 |
| JP | 2018194985 A | 12/2018 |
| JP | 2019016161 A | 1/2019 |
| WO | 2018/222033 A1 | 12/2018 |

OTHER PUBLICATIONS

Maarten Slembrouck, et al. Cell-Based Approach for 3D Reconstruction from Incomplete Silhouettes, ACIVS, 2017, pp. 530-541, Springer International Publishing, XP047455579.

Tatsuhisa Yamaguchi, et al., Cell-based Object Tracking Method for 3D Shape Reconstruction Using Multi-viewpoint Active Cameras, 2009 IEEE 12th International Conference on Computer Vision Workshops, ICCV Workshops, pp. 1306-1313, XP316644090.

* cited by examiner

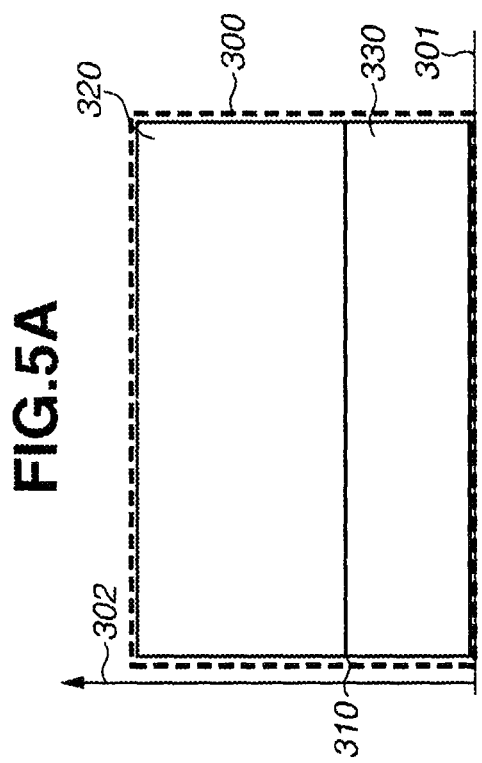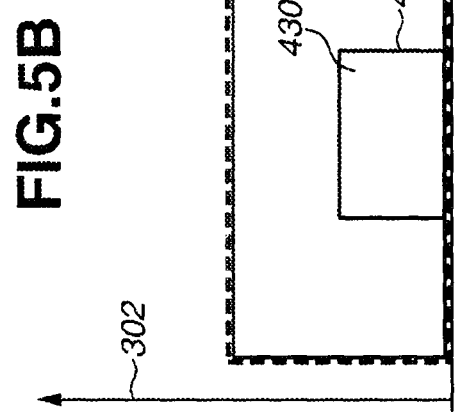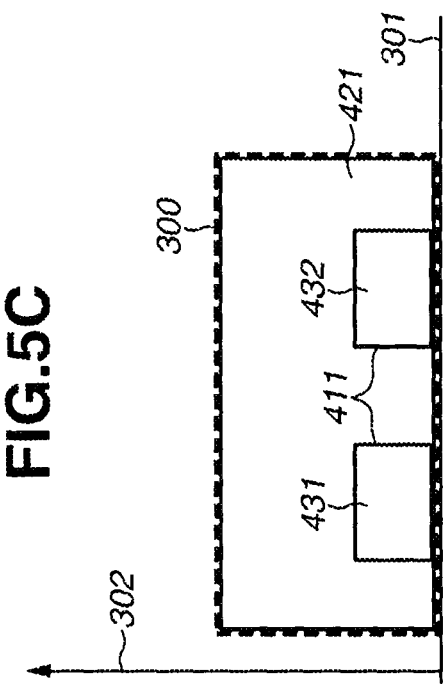

FIG.15

PRIORITY HIGH:         00000000 11111111 00000000 11111111
PRIORITY INTERMEDIATE: 11111111 00000000 00000000 00000000
PRIORITY LOW:          00000000 00000000 11111111 00000000

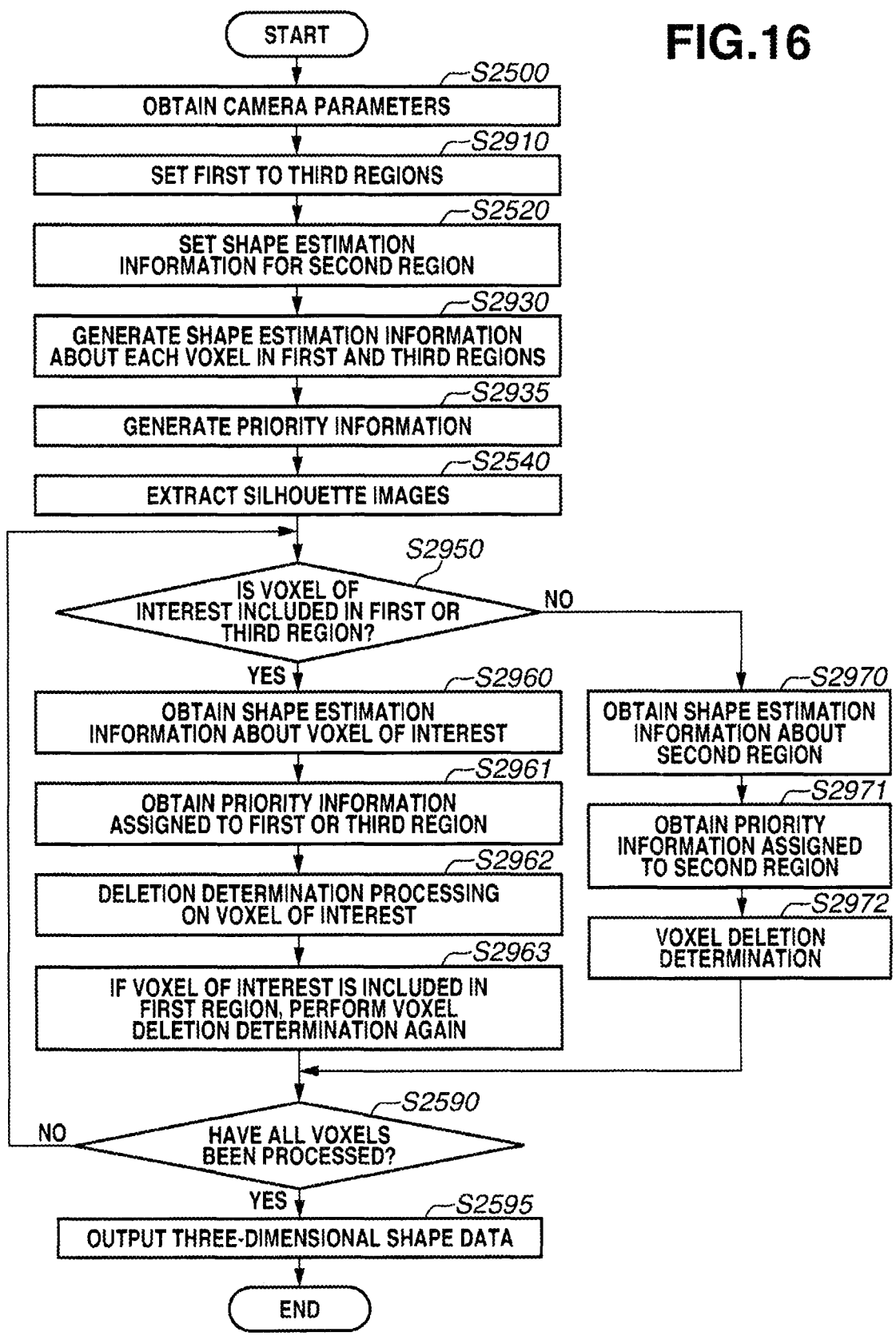

INFORMATION PROCESSING APPARATUS, SHAPE DATA GENERATION METHOD, AND STORAGE MEDIUM

BACKGROUND

Field of the Disclosure

The present disclosure relates to a technique for generating a virtual viewpoint image.

Description of the Related Art

Techniques for generating an image (virtual viewpoint image) seen from a specified viewpoint (virtual viewpoint) by using a plurality of images that is synchronously captured from a plurality of directions by imaging apparatuses installed at different positions has been attracting attention in recent years. By using such techniques for generating a virtual viewpoint image, an image seen from a specified viewpoint can be generated in various events, including a sport game, a concert, and a theatrical performance.

Japanese Patent Laid-Open No. 2015-045920 discusses a method for generating a virtual viewpoint image by using shape data of an object generated based on images of the object (hereinafter, referred to as foreground images) obtained by image capturing using a plurality of imaging apparatuses installed at different positions.

An imaging space which is an image capturing target for the plurality of imaging apparatuses can include objects having different sizes and/or motion characteristics. For example, objects in a rugby game include players and a ball. The ball is small in size and high in moving speed in comparison to persons that are the players. A first space near the ground in the imaging space includes both the players and the ball as objects. A second space above the first space can only include the ball, not the players. When the first and second spaces are processed by the same processing for generating foreground images or generating shape data, processing related to generation of shape data cannot be properly performed due to variations in generation accuracy of foreground images or inaccurate generation of shape data.

SUMMARY

The present disclosure provides a technique for accurately performing processing related to generation of shape data throughout an imaging space.

According to one aspect of the present disclosure, there is provided an information processing apparatus comprising: a first generation unit configured to generate shape data on an object included in a first partial space based on one or more captured images obtained from one or more of a plurality of imaging apparatuses and a first parameter corresponding to the first partial space, the first partial space being included in a plurality of partial spaces in an imaging space which is an image capturing target for the plurality of imaging apparatuses; and a second generation unit configured to generate shape data on an object included in a second partial space based on one or more captured images obtained from one or more of the plurality of imaging apparatuses and a second parameter corresponding to the second partial space, the second partial space being included in the plurality of partial spaces, the second parameter being different from the first parameter.

According to another aspect of the present disclosure, there is provided a shape data generation method comprising: generating shape data on an object included in a first partial space based on one or more captured images obtained from one or more of a plurality of imaging apparatuses and a first parameter corresponding to the first partial space, the first partial space being included in a plurality of partial spaces in an imaging space which is an image capturing target for the plurality of imaging apparatuses; and generating shape data on an object included in a second partial space based on one or more captured images obtained from one or more of the plurality of imaging apparatuses and a second parameter corresponding to the second partial space, the second partial space being included in the plurality of partial spaces, the second parameter being different from the first parameter.

According to another aspect of the present disclosure, there is provided a non-transitory computer-readable storage medium storing a computer program for causing a computer to perform a shape data generation method, the shape data generation method comprising: generating shape data on an object included in a first partial space based on one or more captured images obtained from one or more of a plurality of imaging apparatuses and a first parameter corresponding to the first partial space, the first partial space being included in a plurality of partial spaces in an imaging space which is an image capturing target for the plurality of imaging apparatuses; and generating shape data on an object included in a second partial space based on one or more captured images obtained from one or more of the plurality of imaging apparatuses and a second parameter corresponding to the second partial space, the second partial space being included in the plurality of partial spaces, the second parameter being different from the first parameter.

Further features of the present disclosure will become apparent from the following description of exemplary embodiments with reference to the attached drawings.

BRIEF DESCRIPTION OF THE DRAWINGS

FIGS. 5A to 5C are diagrams schematically illustrating examples of an imaging space divided into a plurality of partial spaces.

FIG. 15 is a schematic diagram illustrating an example of priority information.

FIG. 16 is a flowchart illustrating an example of processing performed by a shape estimation apparatus.

DESCRIPTION OF THE EMBODIMENTS

Figure 1:
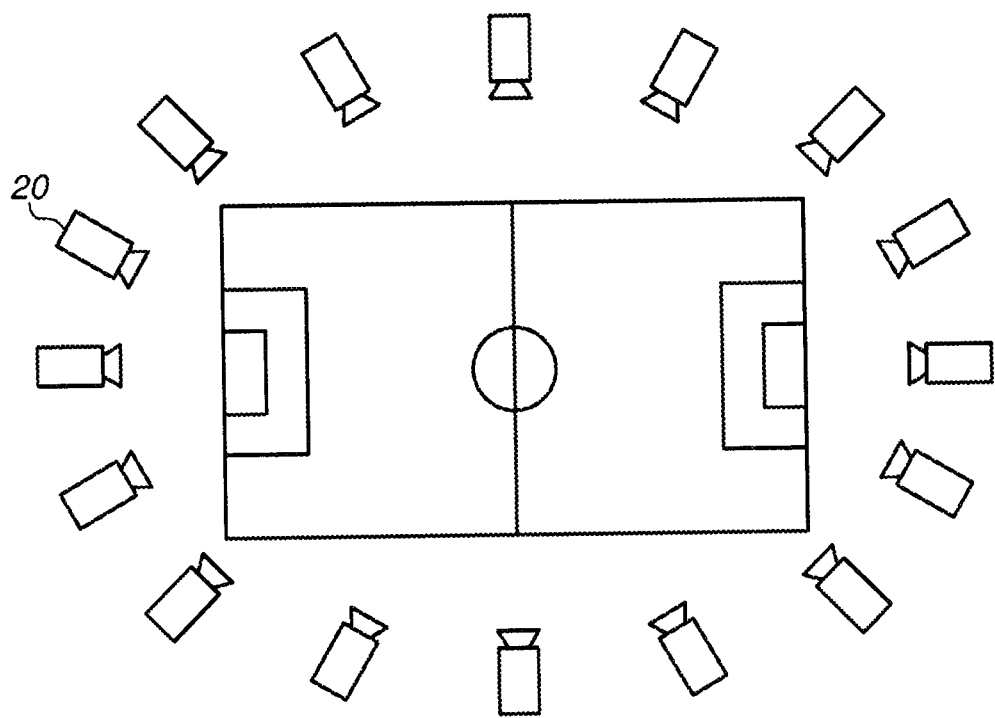
FIG. 1 is a diagram illustrating an example arrangement of a plurality of imaging apparatuses.

Hereinafter, embodiments will be described in detail with reference to the attached drawings. Note, the following embodiments are not intended to limit the scope of the claimed disclosure. Multiple features are described in the embodiments, but limitation is not made an disclosure that requires all such features, and multiple such features may be combined as appropriate. Furthermore, in the attached drawings, the same reference numerals are given to the same or similar configurations, and redundant description thereof is omitted.

First Exemplary Embodiment

The present exemplary embodiment relates to a shape estimation apparatus that generates shape data on objects in an imaging space which is an image capturing target for a plurality of imaging apparatuses. Initially, an issue to be solved by the present exemplary embodiment will be described. When shape data on the objects in the imaging space which is an image capturing target for the plurality of imaging apparatuses is generated, processing related to generation of shape data may be not properly performed in a case where objects having different sizes or motion characteristics are included in the imaging space. For example, in the case of capturing images of a rugby game, the imaging space includes players and a ball. Since the ball is small in size and high in moving speed in comparison to the players, foreground images of the ball may not be properly generated. Consequently, performing the same shape data generation processing on both the ball and the players can lead to a failure in proper generation of shape data. For such a reason, different processing may be performed in generating shape data in accordance with the types of objects (here, player and ball). However, there is a difficulty in identifying the types of objects before the processing related to generation of shape data.

Take rugby as an example. While a space near the ground of the field can include both the players and the ball as objects, a space 10 m above the ground can only include the ball as an object but not the players. In other words, the imaging space can include a partial space where only a certain object can exist. In view of the foregoing, the shape estimation apparatus according to the present exemplary embodiment is configured to perform different processing related to generation of shape data in each partial space. For example, processing related to generation of shape data is performed differently between in the partial space near the ground and in the partial space 10 m above in a rugby game, and therefore the processing related to generation of shape data on the objects can be properly performed throughout the imaging space.

The present exemplary embodiment is applicable to not just the foregoing case but the following case as well. For example, image capturing of an imaging space is performed by a plurality of imaging apparatuses including imaging apparatuses having different angles of view. In such a case, for example, telescopic cameras and wide angle cameras are used to capture images of a space where an important scene (such a goal scene in soccer) can occur, while only wide angle cameras are used to capture images of the entire remaining space. As another example, telescopic cameras are used to capture images of the space near the ground to capture high-resolution images of the players, while only wide angle cameras are used to capture images of the space above the field where only the ball can be included. When an image of an object is captured by a wide angle camera, an area of the object in the captured image is smaller than an area of the object in an image captured by a telescopic camera. This can be the reason that processing related to generation of shape data is not properly performed. Even in such a case, the shape estimation apparatus according to the present exemplary embodiment can be applied to properly perform the processing related to generation of shape data on objects throughout an imaging space.

The shape estimation apparatus according to the present exemplary embodiment will be described below. The shape data generated by the shape estimation apparatus is used to generate a virtual viewpoint image. The virtual viewpoint image according to the present exemplary embodiment is one called free viewpoint image. However, the virtual viewpoint image is not limited to one corresponding to a virtual viewpoint freely (arbitrarily) specified by a user. For example, virtual viewpoint images may include one corresponding to a virtual viewpoint selected by the user from among a plurality of candidates. The virtual viewpoint may be specified by user operations, or automatically specified based on a result of image analysis. In the present exemplary embodiment, a description will be given of a case mainly where the virtual viewpoint image is a still image. However, the virtual viewpoint image may be a moving image.

The plurality of imaging apparatuses that is used to generate a virtual viewpoint can be disposed to surround the imaging space like imaging apparatuses 20 illustrated in FIG. 1, for example. Examples of subjects of imaging by the plurality of imaging apparatuses include events, such as a sport game, a concert, and a theatrical performance. The imaging space refers to the space where such an event is held. For example, in the case of rugby, the imaging space refers to a three-dimensional space including the ground and a given height in the rugby stadium. The objects refer to physical objects in the imaging space. Examples include players in a field and a ball in a ball game. The imaging apparatuses are installed at respective different positions and synchronously capture images in different imaging directions. The imaging apparatuses do not need to be installed all around the imaging space, and may be installed only in some directions of the imaging space due to limitation on the installation locations. The number of imaging apparatuses is not limited in particular. For example, in a case where the imaging space is a soccer stadium, several tens to several hundreds of imaging apparatuses may be installed around in the stadium.

An imaging system according to the present exemplary embodiment includes a plurality of imaging apparatuses including telescopic cameras and wide angle cameras. For example, a high-resolution captured image of players in a rugby game can be obtained by image capturing using telescopic cameras. This improves the resolution of a generated virtual viewpoint image. Meanwhile, in a case where telescopic cameras are used to capture an image of the ball, a large number of imaging apparatuses are installed since the ball moves in a wide range. The number of imaging apparatuses to be installed can be reduced by using wide angle cameras having wide angles of view to capture an image of the ball. As another example, in a rugby game, the players are expected to spread out in the field near the ground while the ball can be included in the space above the field. An image of a partial space near the ground where the players play in the imaging space and an image of a partial space, for example, 10 m above the ground where the ball reaches can therefore be captured by imaging apparatuses having respective different angles of view. As yet another example, the imaging system may be configured so that, in soccer, an images of spaces where players are likely to gather and important scenes (such as a goal scene) are likely to occur, such as in front of the goalposts and the penalty areas, is captured by telescopic cameras while an image of the other space is captured by wide angle cameras. Such an imaging system including imaging apparatuses having different angles of view, like telescopic cameras and wide angle cameras, thus enables generation of a high-resolution virtual viewpoint image while reducing the number of imaging apparatuses installed. The configuration of the imaging system is not limited thereto. For example, the imaging system may include imaging apparatuses having the same angles of view, or different types of imaging apparatuses other than the foregoing.

Figure 2:
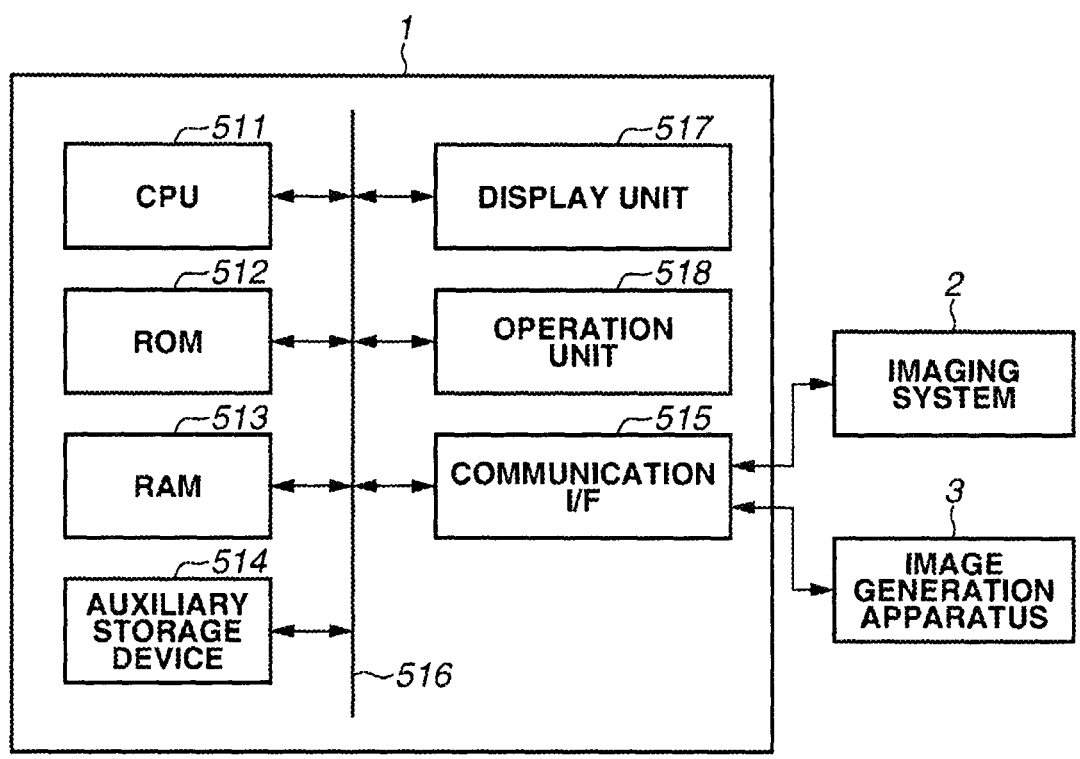
FIG. 2 is a diagram for describing a hardware configuration of a shape estimation apparatus.

FIG. 2 is a diagram for describing a hardware configuration of a shape estimation apparatus 1 according to the present exemplary embodiment. The shape estimation apparatus 1 includes a central processing unit (CPU) 511, a read-only memory (ROM) 512, a random access memory (RAM) 513, an auxiliary storage device 514, a communication interface (I/F) 515, a bus 516, a display unit 517, and an operation unit 518. The CPU 511 implements various functions of the shape estimation apparatus 1 by controlling the entire shape estimation apparatus 1, using computer programs and data stored in the ROM 512 and the RAM 513. The shape estimation apparatus 1 may include one or a plurality of pieces of dedicated hardware different from the CPU 511, and at least part of the processing by the CPU 511 may be performed by the dedicated hardware. Examples of the dedicated hardware include an application specific integrated circuit (ASIC), a field-programmable gate array (FPGA), and a digital signal processor (DSP). The ROM 512 stores unchangeable programs. The RAM 513 temporarily stores programs and data supplied from the auxiliary storage device 514, and data supplied from outside via the communication OF 515. The auxiliary storage device 514 includes a hard disk drive, for example. The auxiliary storage device 514 stores various types of data such as image data and audio data.

The communication I/F 515 is used to communicate with apparatuses outside the shape estimation apparatus 1. For example, when a wired connection is used between the shape estimation apparatus 1 and an external apparatus, a communication cable is connected to the communication I/F 515. When the shape estimation apparatus 1 has a function of wirelessly communicating with an external apparatus, the communication I/F 515 includes an antenna. The shape estimation apparatus 1 according to the present exemplary embodiment communicates with an imaging system 2 and an image generation apparatus 3 to be described below via the communication I/F 515. The bus 516 connects the components of the shape estimation apparatus 1 and transmits information. While, in the present exemplary embodiment, the auxiliary storage device 514 is disposed inside the shape estimation apparatus 1, the auxiliary storage device 514 may be externally connected to the shape estimation apparatus 1.

The display unit 517 includes a liquid crystal display and a light-emitting diode (LED), for example. The display unit 517 displays a graphical user interface (GUI) for the user to operate the shape estimation apparatus 1. The operation unit 518 includes a keyboard, a mouse, a joystick, and/or a touch panel, for example. The operation unit 518 receives the user's operations and inputs various instructions to the CPU 511. The CPU 511 operates as a display control unit for controlling the display unit 517 and an operation control unit for controlling the operation unit 518.

While, in the present exemplary embodiment, the display unit 517 and the operation unit 518 are disposed inside the shape estimation apparatus 1, at least either one of the display unit 517 and the operation unit 518 may be configured as a separate apparatus outside the shape estimation apparatus 1.

Figure 3:
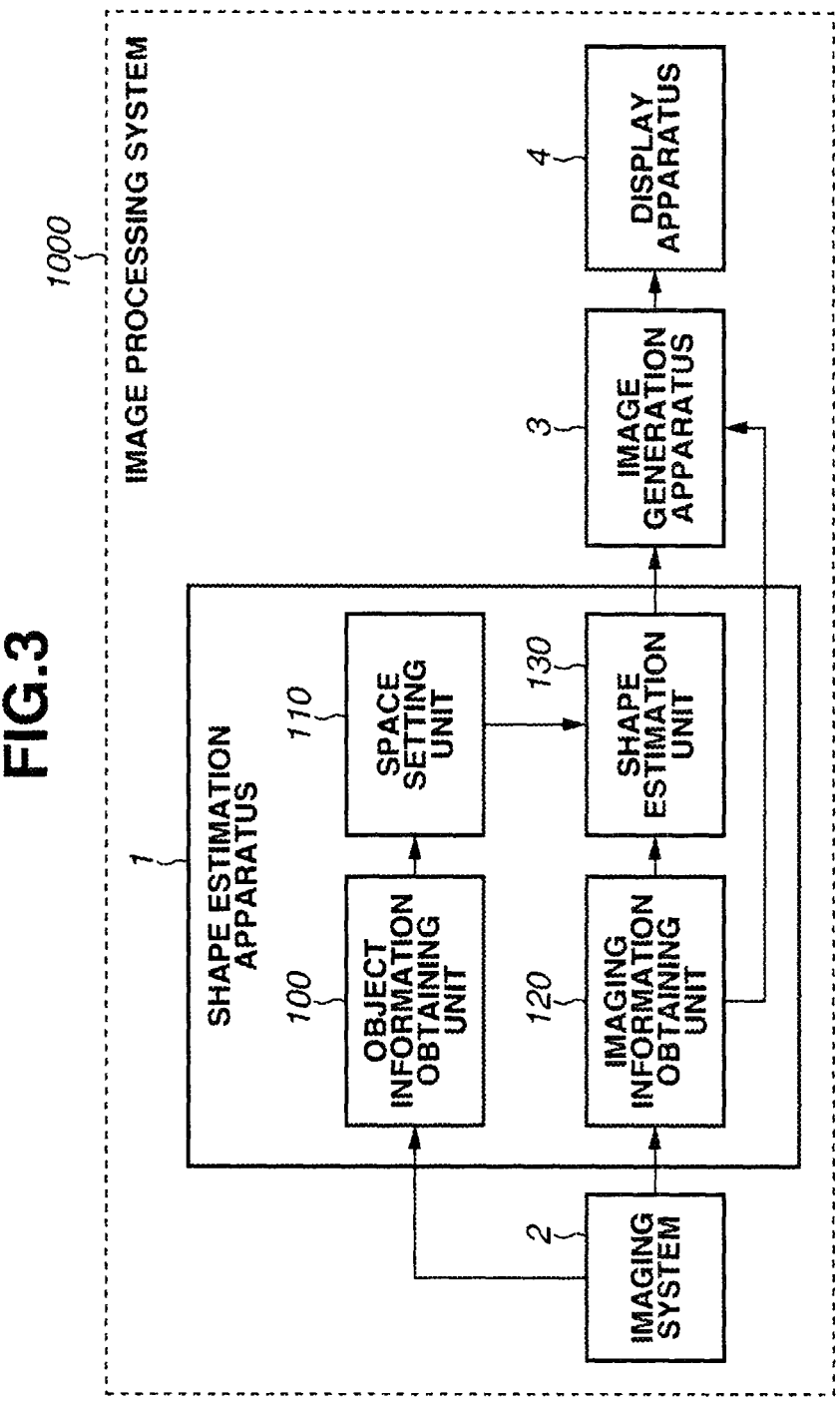
FIG. 3 is a diagram for describing a configuration of an image processing system including the shape estimation apparatus.

FIG. 3 is a diagram for describing a configuration of an image processing system 1000 including the shape estimation apparatus 1 according to the present exemplary embodiment. A system and apparatuses included in the image processing system 1000 will be described with reference to FIG. 3. The image processing system 1000 includes the shape estimation apparatus 1, an imaging system 2, an image generation apparatus 3, and a display apparatus 4. The shape estimation apparatus 1 generates shape data on an object in an imaging space which is a target of image capturing by the imaging system 2, and transmits the generated shape data to the image generation apparatus 3. A detailed description of the shape estimation apparatus 1 will be given below.

Figure 4:
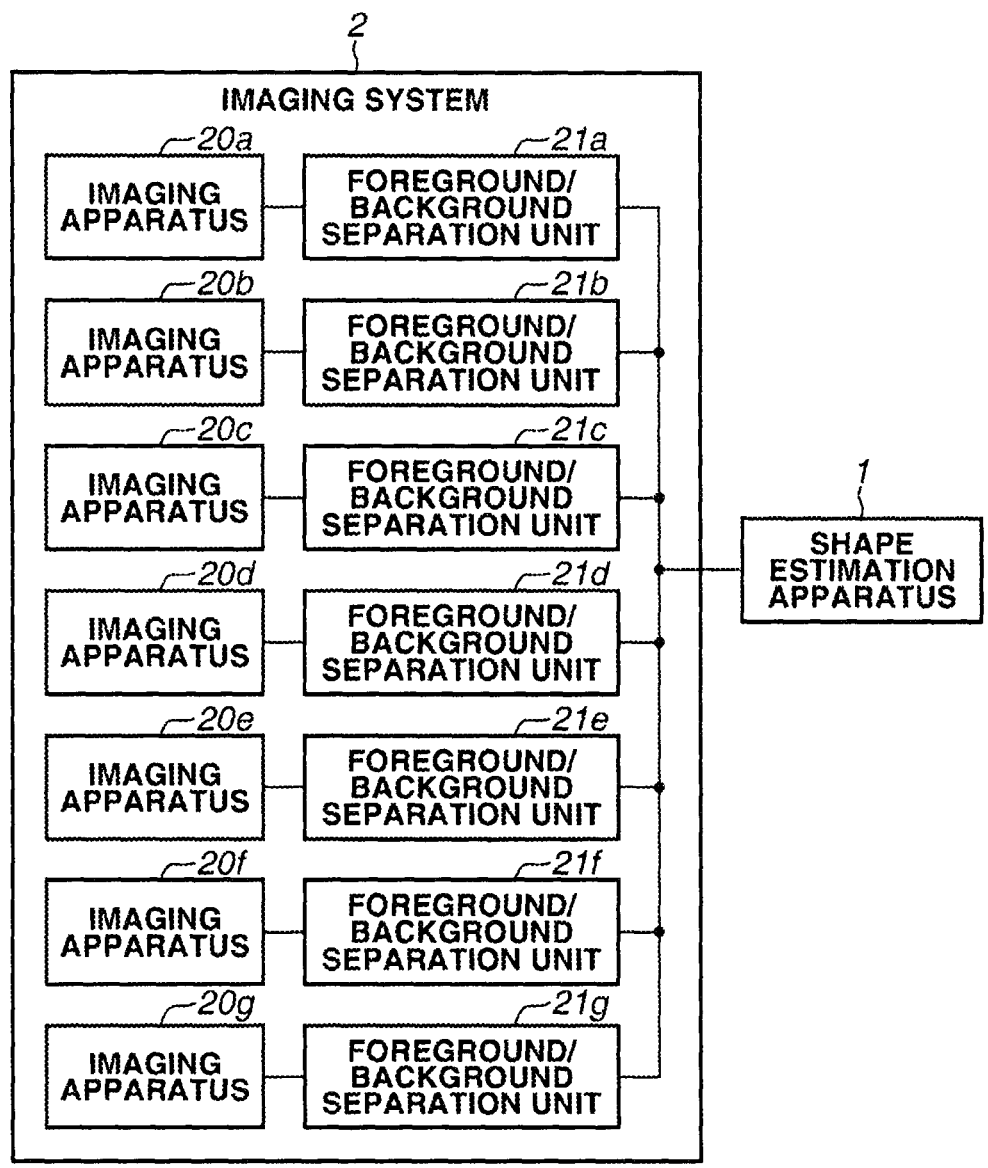
FIG. 4 is a diagram for describing an example of a configuration of an imaging system.

The imaging system 2 is a system including a plurality of imaging apparatuses as described above. FIG. 4 is a diagram for describing an example of a configuration of the imaging system 2 according to the present exemplary embodiment. The imaging system 2 illustrated in FIG. 4 includes seven imaging apparatuses 20a to 20g. The number of imaging apparatuses included in the imaging system 2 is not limited thereto. The imaging system 2 according to the present exemplary embodiment includes foreground/background separation units 21a to 21g. The imaging apparatuses 20a to 20g are connected to the foreground/background separation units 21a to 21g, respectively. In the following description, the imaging apparatuses 20a to 20g and the foreground/background separation units 21a to 21g will be referred to simply as imaging apparatuses 20 and separation units 21 unless a specific distinction is made.

Each of the plurality of imaging apparatuses 20 has an identification number for identifying from among the imaging apparatuses 20 and object information indicating a main image capturing target object. In the present exemplary embodiment, object information indicates the type of object, i.e., whether the object is a person or a moving object other than a person, such as a ball. Examples of the object information include "player" and "ball". When the object information indicates a person, the object information may include more detailed information such as "player A" and "player B". The identification number and the object information are set in advance. In the present exemplary embodiment, each of the imaging apparatuses 20 is given a piece of object information. The separation units 21 separate regions corresponding to the foreground from regions corresponding to the background to generate foreground images and background images from the captured images obtained by image capturing of the imaging space using the imaging apparatuses 20. In the present exemplary embodiment, the foreground refers to a dynamic physical object (moving body) that is movable (can change in absolute position or shape) when images thereof are captured in the same direction in a time-series manner, among physical objects corresponding to objects. Examples of dynamic physical objects, aside from the foregoing players and ball, include persons such as athletes and judges in an athletic field, and singers, players, performers, and masters of ceremony in a concert or entertainment. Foreground images can be obtained by extracting regions corresponding to such dynamic physical objects from the captured images.

The background refers to an imaging target that is stationary or remains in a near stationary state when images thereof are captured in the same direction in a time-series manner, among the physical objects corresponding to the objects. Examples of such imaging targets include a concert stage, a stadium where an athletic event is held, goalposts and other structures used in a ball game, and an athletic field. In other words, the background refers to regions at least different from physical objects corresponding to the foreground. Background images can be obtained by removing the physical objects corresponding to the foreground from the captured images. Physical objects other than the foregoing foreground and background may be included as objects to be captured by the imaging apparatuses 20.

The separation units 21 perform separation processing for extracting the foreground to generate foreground images based on the object information that the imaging apparatuses 20 have. For example, in a case where an imaging apparatus 20 has object information "player", the corresponding separation unit 21 uses background subtraction as the separation processing. The background subtraction is a method for extracting the foreground by calculating differences between a captured image and a background image. The background image is updated at regular time intervals, and therefore the foreground is robustly extracted even when brightness varies. In a case where, for example, the imaging apparatus 20 has object information "ball", the separation unit 21 uses frame subtraction as the separation processing. The frame subtraction is a method for extracting the foreground by using successively captured frames. In a case where the object moves over a wide area at high speed according to the physical laws, like a ball, the object is robustly extracted by calculating differences between the captured image from which the foreground is extracted and a frame captured several frames before among the successively captured frames. As described above, the separation units 21 use different separation processing in accordance with the main target object captured by the imaging apparatuses 20. The separation units 21 can thus improve accuracy of a foreground image even in a case where the target objects captured by the imaging apparatuses 20 differ in at least either size or a motion characteristic. The separation units 21 corresponding to the respective imaging apparatuses 20 may be configured to retain the object information, in which case the separation units 21 perform separation processing on the captured images obtained from the imaging apparatuses 20 by using techniques corresponding to the object information retained in the respective separation units 21.

The separation units 21 perform noise reduction processing on the generated foreground images. Examples of the noise reduction processing include a method for reducing noise regions by filtering. Filtering processing parameters of different values are set based on the object information retained by the respective imaging apparatuses 20. The processing parameter is used to determine whether a specific region in a foreground image is noise. For example, the processing parameter is expressed by pixel area. As employed herein, the pixel area refers to the number of pixels expressing an area of a region corresponding to an object in a captured image. For example, in a case where the object information is "player", the processing parameter is set based on a standard body type of a player. A region significantly different from the pixel area corresponding to a player's size is thus determined to be a noise region. As another example, in a case where the object information is "ball", the processing parameter is set based on the size and shape of a soccer ball or rugby ball. The processing parameter to be used in the noise reduction processing may be determined based on the angle of view of the imaging apparatus 20. For example, when an image of an object is captured by a wide angle camera, a pixel area corresponding to the object in the captured image is expected to be smaller than a pixel area corresponding to the object in an image captured by a telescopic camera. When an image of an object is captured by a wide angle camera, the processing parameter is determined so that a region extremely larger than the pixel area of the object is determined to be a noise region. Meanwhile, when an image of an object is captured by a telescopic camera, the processing parameter is determined so that a region significantly smaller than the pixel area of the object is determined to be a noise region. This enables noise reduction while keeping the object region even in a case where different angles of view are used among the imaging apparatuses 20. The separation units 21 may retain a plurality of processing parameters, and select a processing parameter to be used from among the plurality of processing parameters in accordance with the object information retained by the imaging apparatuses 20.

The separation units 21 transmit the generated foreground images to the shape estimation apparatus 1. The types of separation processing and noise reduction processing performed by the separation units 21 are not limited to the foregoing, and other processing may be performed. In the present exemplary embodiment, the separation units 21 are included in the imaging system 2. However, the separation units 21 may be configured to be included in the respective imaging apparatuses 20 or the shape estimation apparatus 1, or externally connected as separate apparatuses.

Returning to FIG. 3, the image generation apparatus 3 generates a virtual viewpoint image by using the shape data generated by the shape estimation apparatus 1. The method for generating the virtual viewpoint image will be described below. The image generation apparatus 3 transmits the generated virtual viewpoint image to the display apparatus 4. The display apparatus 4 includes a liquid crystal display and an LED, for example, and displays the virtual viewpoint image transmitted from the image generation apparatus 3. Aside from the virtual viewpoint image, the display apparatus 4 also displays a GUI which is used by the user to input operations for generating a virtual viewpoint image.

Next, a functional configuration of the shape estimation apparatus 1 will be described with reference to FIG. 3. The shape estimation apparatus 1 includes an object information obtaining unit 100, a space setting unit 110, an imaging information obtaining unit 120, and a shape estimation unit 130. These processing units are described below.

The object information obtaining unit 100 obtains the identification numbers and the object information that the respective plurality of imaging apparatuses 20 has from the imaging system 2. The object information obtaining unit 100 may be configured to obtain a file in which the identification numbers of the imaging apparatuses 20 and the object information are linked with each other from an external storage device.

The space setting unit 110 divides the imaging space to be captured by the imaging system 2 into a plurality of partial spaces, and performs settings to associate the partial spaces with object information. As employed herein, dividing the imaging space refers to virtually dividing the imaging space into a plurality of partial spaces. FIGS. 5A to 5C are diagrams schematically illustrating examples of the imaging space divided into a plurality of partial spaces. The shape estimation apparatus 1 according to the present exemplary embodiment generates shape data on an object in an imaging space 300 illustrated by the broken lines. While the imaging space 300 is different from a space where shape estimation is performed (shape estimation space), the imaging space 300 and the shape estimation space are described to be the same in the present exemplary embodiment.

The imaging space 300 is a three-dimensional space and set in association with coordinates on the captured images obtained by the imaging system 2. In the example illustrated in FIG. 5A, the ground 301 of a stadium where a sport even is held is defined as an xy plane represented by an x-axis and a y-axis. A z-axis is defined in a direction 302 perpendicular to the ground 301. The ground 301 is at z=0. A border 310 is set to divide the imaging space 300 into a partial space 320 and a partial space 330. The border 310 is expressed by using three-dimensional coordinates indicating a height, such as "z=2 m". The imaging space 300 and the border 310 are set by the space setting unit 110 obtaining the information about the three-dimensional coordinates from the auxiliary storage device 514 or an external storage device. The origin and coordinate axes of the coordinates expressing the imaging space 300 can be set at any position and in any directions.

FIGS. 5B and 5C are diagrams illustrating other examples of partial spaces determined based on the imaging space 300 and a border or borders. The imaging space 300 in FIG. 5B is divided into a partial space 430 of rectangular solid shape and the other partial space 420 by a border 410. FIG. 5C illustrates a case with three divided partial spaces. The imaging space 300 in FIG. 5C is divided into partial spaces 431 and 432 of rectangular solid shape and the other partial space 421 by borders 411. In such a manner, the space setting unit 110 divides the imaging space 300 into two or more partial spaces by a given border or borders.

The space setting unit 110 associates each of the plurality of partial spaces (for example, the partial spaces 320 and 330) determined based on the imaging space 300 and the border 310 with the object information obtained by the object information obtaining unit 100. The partial spaces 320 and 330 are associated with object information indicating objects likely to be included in the respective partial spaces 320 and 330. A case where the partial spaces 320 and 330 illustrated in FIG. 5A are set in the imaging space 300 where images of a rugby game are captured will be described as an example. The partial space 330 from the ground 301 to the border 310 can include both players and a ball as objects. The partial space 330 is associated with object information "player" since the proportion of the players included as objects near the ground 301 is expected be higher than that of the ball. By contrast, the partial space 320 above the border 310 rarely includes players but can often include the ball bouncing high. The partial space 320 is thus associated with object information "ball".

In a case where partial spaces are set as illustrated in FIG. 5B or 5C, the partial spaces can be associated with object information based on a similar idea to the foregoing. For example, the partial spaces 420 and 430 in FIG. 5B are associated with object information indicating "infielder" and "outfielder" in baseball, respectively. As another example, in a game where the players play in their own territories like volleyball, the partial spaces 431, 432, and 421 in FIG. 5C are associated with object information indicating team-by-team player classifications "team A player" and "team B player", and "ball", respectively. The space setting unit 110 transmits the information indicating the partial spaces and the identification numbers of the imaging apparatuses 20 associated with the object information linked with the respective partial spaces to the shape estimation unit 130.

The space setting unit 110 also sets processing parameters that the shape estimation unit 130 to be described below uses in performing shape estimation processing based on the object information associated with the partial spaces. For example, the space setting unit 110 sets a first processing parameter for the partial space 320 that is a first partial space included in the imaging space 300, and a second processing parameter different from the first processing parameter for the partial space 330 that is a second partial space. Processing parameters are similarly set for an imaging space including three or more partial spaces (for example, the imaging space 300 illustrated in FIG. 5C). There is thus at least one combination of partial spaces for which different processing parameters are set. In a case where there is a plurality of partial spaces including the first and second partial spaces for which different processing parameters are set, either the first or second processing parameter may be set for a partial space or spaces other than the first and second partial spaces. The space setting unit 110 also transmits the set processing parameters to the shape estimation unit 130.

While, in the present exemplary embodiment, the partial spaces are set based on objects likely to be included in the respective partial spaces, partial spaces may be set based on the likelihood of occurrence of an important scene. For example, in a soccer game, important scenes such as a goal scene are likely to occur in front of the goalposts. In such a case, the space setting unit 110 sets partial spaces including in front of the goalposts and a partial space including the other areas, and associates the partial spaces with information such as "importance: high" and "importance: low", respectively. Partial spaces may be set based on which space includes more objects and which space includes fewer objects in the imaging space.

The imaging information obtaining unit 120 obtains the foreground images generated by the imaging system 2. The imaging information obtaining unit 120 also obtains imaging parameters of the respective imaging apparatuses 20 included in the imaging system 2 from the imaging system 2. The imaging parameters include external parameters indicating the installation positions of the imaging apparatuses 20 and the orientations of the imaging apparatuses 20, and internal parameters indicating the focal lengths, optical centers, and lens distortions of the imaging apparatuses 20. The imaging information obtaining unit 120 can also calculate the imaging parameters by using existing calibration processing based on the captured images obtained from the imaging system 2. As an example of the existing calibration processing, the imaging information obtaining unit 120 obtains a plurality of captured images from the imaging system 2, and calculates corresponding points between the captured images by using feature points in the plurality of captured images. The imaging information obtaining unit 120 then calculates the imaging parameters by optimizing the calculated corresponding points to minimize errors to occur when the corresponding points are projected on the imaging apparatuses 20, and calibrating the imaging apparatuses 20. The calibration processing to be used is not limited to the foregoing. Moreover, the imaging parameters may be obtained in a preparation phase where the imaging apparatuses 20 are installed. The imaging information obtaining unit 120 may calculate the imaging parameters each time captured images are obtained. The imaging parameters may be calculated based on captured images obtained in the past. The imaging information obtaining unit 120 transmits the obtained foreground images and imaging parameters to the shape estimation unit 130 and the image generation apparatus 3.

The shape estimation unit 130 performs object shape estimation processing to generate shape data based on the information indicating the partial spaces and the identification numbers obtained from the space setting unit 110, and the foreground images and the imaging parameters obtained from the imaging information obtaining unit 120. The shape estimation unit 130 according to the present exemplary embodiment generates three-dimensional model data by using shape-from-silhouette that is a conventional technique. Techniques other than shape-from-silhouette may be used as the method for generating three-dimensional model data.

Based on the information indicating the partial spaces and the identification numbers obtained from the space setting unit 110, the shape estimation unit 130 identifies one or more imaging apparatuses 20 having the identification number(s) corresponding to each partial space. The shape estimation unit 130 also performs object shape estimation by using the foreground image(s) generated based on one or more captured images obtained from the one or more imaging apparatuses 20 identified. For example, suppose that the partial spaces 320 and 330 illustrated in FIG. 5A are associated with object information indicating "ball" and "player", respectively. In the partial space 320, the shape estimation unit 130 performs shape estimation by using the foreground image(s) generated based on the one or more captured images obtained from the one or more imaging apparatuses 20 having the identification number(s) linked with the object information indicating "ball". In the partial space 330, the shape estimation unit 130 performs shape estimation by using the foreground image(s) generated based on the one or more captured images obtained from the one or more imaging apparatuses 20 having the identification number(s) linked with the object information indicating "player".

The shape estimation processing performed by the shape estimation unit 130 will be described. The shape estimation unit 130 generates silhouette images expressing regions corresponding to the foreground and other regions in the captured images in binary values based on the foreground images. For example, a silhouette image is an image where regions corresponding to the foreground have a pixel value of 1 and the other regions a pixel value of 0. The shape estimation unit 130 converts the coordinates of a representative point (for example, center) of a voxel (a unit used in a technique for expressing a three-dimensional space by a set of cubes having a unit volume) to be processed into coordinates in the coordinate systems of the captured images obtained by the respective imaging apparatuses 20 (captured image systems) by using the imaging parameters. The shape estimation unit 130 determines whether the coordinates in the captured image systems are included in a foreground region. Specifically, the shape estimation unit 130 determines whether the pixel values on the silhouette images corresponding to the coordinates in the captured image systems have a value corresponding to a foreground region (in the foregoing example, a pixel value of 1). In a case where the coordinates in all the captured image systems are determined to be included in a foreground region, the shape estimation unit 130 determines that the voxel corresponding to the coordinates is part of the shape of an object. Meanwhile, in a case where there is a captured image where the coordinates are determined to be included in a region different from a foreground region (the pixel value corresponding to the coordinates on the silhouette image is 0), the shape estimation unit 130 determines that the voxel corresponding to the pixel is not part of the shape of an object. The shape estimation unit 130 performs the foregoing processing on each of the voxels constituting the shape estimation space corresponding to the imaging space, and deletes voxels not determined to be part of the shape of an object, to estimate the shapes of objects. While, in the present exemplary embodiment, the shape estimation unit 130 is configured to generate the silhouette images, the separation units 21 may be configured to generate the silhouette images, and the imaging information obtaining unit 120 may obtain the silhouette images.

In the foregoing shape estimation processing, the shape estimation unit 130 performs shape estimation by using the processing parameters set by the space setting unit 110. Here, a case where the shape estimation processing is performed by using shape estimation parameters as the processing parameters will be described. A shape estimation parameter indicates a predetermined number up to which captured images where the pixel corresponding to the voxel to be processed is determined to not be included in a foreground region are allowed. Suppose, for example, that the shape estimation parameter is set to 1. In such a case, the shape estimation unit 130 determines that the voxel to be processed is part of the shape of an object in a case where the number of captured images where the pixel corresponding to the voxel is determined to not be included in a foreground region is less than or equal to one. Meanwhile, in a case where the number of captured images where the pixel corresponding to the voxel to be processed is determined to not be included in a foreground region is two or more, the voxel is determined to not be part of the shape of an object. The shape estimation unit 130 performs object shape estimation in the respective partial spaces by using such shape estimation parameters.

An example of the shape estimation processing in a case where the partial spaces 320 and 330 illustrated in FIG. 5A are associated with object information indicating "ball" and "player", respectively, will be described. Since the ball is small in size and high in moving speed, the separation units 21 are likely to fail in foreground extraction. The shape estimation unit 130 therefore performs the shape estimation processing in the partial space 320 with the shape estimation parameter set to 1. The shape estimation unit 130 can thus perform shape estimation even in a case where there is a captured image where foreground extraction fails. Meanwhile, foreground extraction can be accurately performed for the players compared to the ball. The shape estimation unit 130 therefore performs the shape estimation processing in the partial space 330 with the shape estimation parameter set to 0. The shape estimation unit 130 can thus perform accurate shape estimation on the players. As described above, accurate shape estimation on an object likely to fail in foreground extraction like the ball can be performed by performing the shape estimation processing using a shape estimation parameter having a greater value than with an object less likely to fail in foreground extraction. The foregoing shape estimation parameters are set for the respective partial spaces by the space setting unit 110. For example, in the partial space 320 that is the first partial space included in the imaging space 300, the shape estimation unit 130 performs the shape estimation processing by using the shape estimation parameter set to 1. In the partial space 330 that is the second partial space, the shape estimation unit 130 performs the shape estimation processing by using the shape estimation parameter set to 0.

The value of the shape estimation parameter may be determined based on the number of imaging apparatuses 20 for capturing images of an object. Suppose, for example, that the numbers of imaging apparatuses 20 associated with object information indicating "ball" and "player" are 10 and 50, respectively. Since the number of imaging apparatuses 20 corresponding to "player" is greater than that of imaging apparatuses 20 corresponding to "ball", the imaging apparatuses 20 corresponding to "player" are expected more likely to include an imaging apparatus or apparatuses 20 failing in foreground extraction due to a breakdown. In such a case, for example, the shape estimation in the partial space corresponding to "ball" is performed with the shape estimation parameter set to 1, and the shape estimation in the partial space corresponding to "player" is performed with the shape estimation parameter set to 4. This enables the shape estimation unit 130 to perform accurate shape estimation in consideration of the numbers of imaging apparatuses 20. The foregoing values of the shape estimation parameter are just examples, and values other than the foregoing may be used for the shape estimation parameters. The shape estimation unit 130 generates shape data based on the result of the shape estimation processing, and transmits the shape data to the image generation apparatus 3.

In the present exemplary embodiment, the shape estimation unit 130 is described to generate three-dimensional model data. However, the shape estimation unit 130 can be configured to generate two-dimensional shape data. In such a case, as the processing for generating shape data, the shape estimation unit 130 generates foreground images based on the captured images. The imaging information obtaining unit 120 here obtains the captured images from the imaging system 2 and transmits the captured images to the shape estimation unit 130. The space setting unit 110 sets a processing parameter for specifying the processing technique for generating the foreground images. For example, suppose that "1" is assigned as a parameter indicating background subtraction, and "2" as a parameter indicating frame subtraction. For the partial space 330 to which the object information "player" corresponds, the space setting unit 110 sets "2" as the processing parameter. For the partial space 320 to which the object information "ball" corresponds, the space setting unit 110 sets "1" as the processing parameter. This enables the shape estimation unit 130 to accurately generate the foreground images depending on the objects.

As the processing parameters in the case where the shape estimation unit 130 generates two-dimensional shape data, the space setting unit 110 also sets processing parameters to be used for the foregoing noise reduction processing on the foreground images. Again, different processing parameters are set based on the object information (for example, "ball" and "player") corresponding to the plurality of partial spaces (for example, the partial spaces 320 and 330). This enables the shape estimation unit 130 to remove regions that are extracted as the foreground but have a significantly different size (pixel area) from that of a foreground region as noise regions when generating the two-dimensional shape data, and therefore the accuracy of the foreground images improves.

Figure 6:
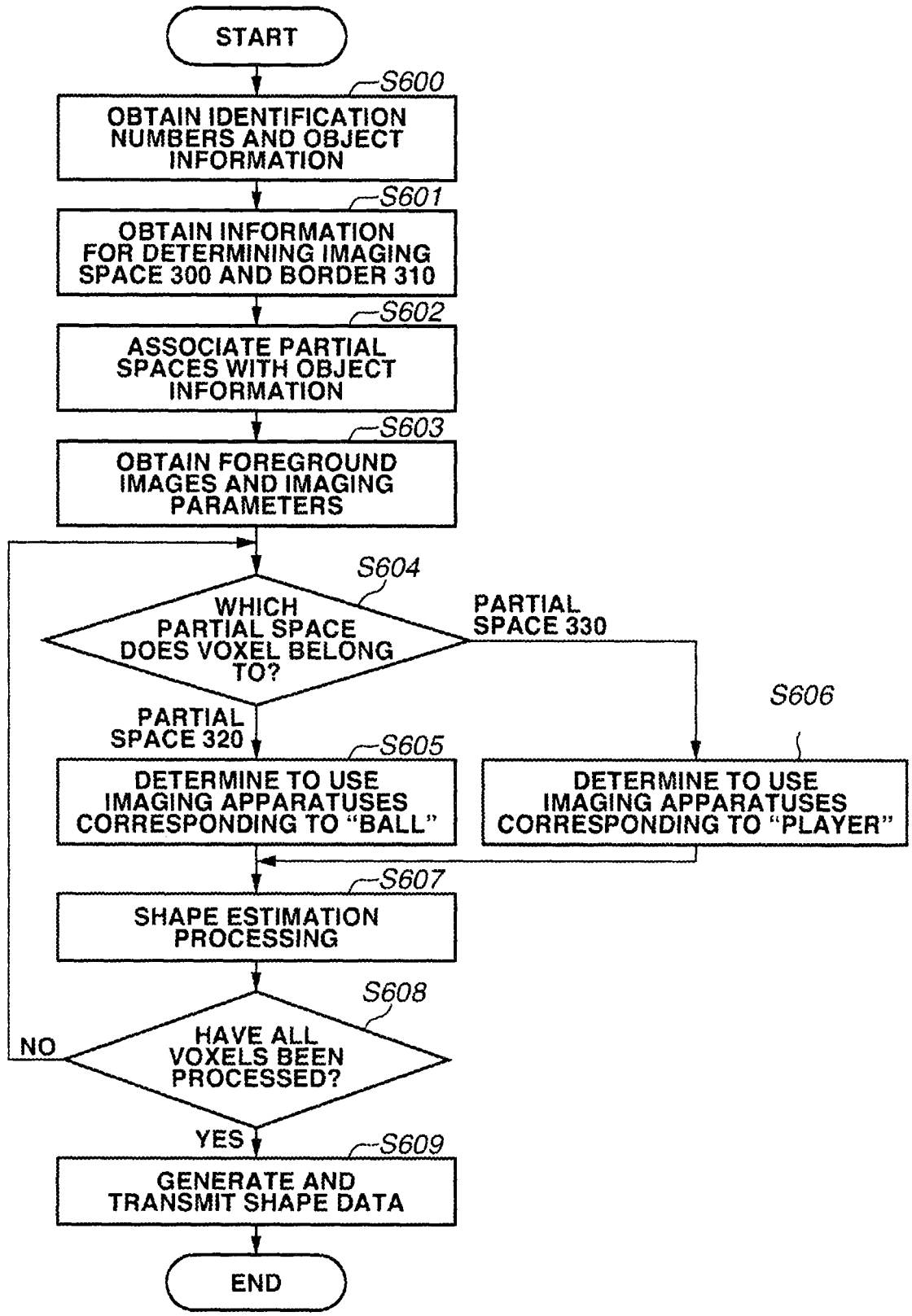
FIG. 6 is a flowchart for describing an example of processing performed by the shape estimation apparatus.

FIG. 6 is a flowchart for describing processing performed by the shape estimation apparatus 1. The processing illustrated in FIG. 6 is performed by the CPU 511 reading a program stored in the ROM 512 or the auxiliary storage device 514 and executing the program. In the following description, the processing of the shape estimation apparatus 1 in a case where the partial spaces 320 and 330 included in the imaging space 300 illustrated in FIG. 5A are associated with object information indicating "ball" and "player", respectively, will be described as an example of the processing. The processing is started by the shape estimation apparatus 1 communicating data on the object information with the imaging system 2.

In step S600, the object information obtaining unit 100 obtains the identification numbers and the object information that the respective plurality of imaging apparatuses 20 has from the imaging system 2. The object information obtaining unit 100 transmits the obtained identification numbers and object information to the space setting unit 110. In step S601, the space setting unit 110 obtains the information for determining the imaging space 300 and the border 310 from the auxiliary storage device 514 or an external storage device. The space setting unit 110 sets partial spaces based on the obtained information. In the present processing, the partial spaces 320 and 330 are set with the border 310 as "z=2 m".

In step S602, the space setting unit 110 associates the partial spaces 320 and 330 set in step S601 with respective pieces of object information based on preset information. As employed herein, the preset information includes information for associating the partial space above the z coordinate indicating the border 310 with the object information "ball", and information for associating the partial space at or below the z coordinate indicating the border 310 with the object information "player". In the present processing, the partial space 320 above "z=2 m" indicated by the border 310 is thus associated with "ball". The partial space 330 at or below "z=2 m" is associated with "player". The space setting unit 110 transmits the information indicating the partial spaces 320 and 330 and the identification numbers of the imaging apparatuses 20 linked with the object information associated with the respective partial spaces 320 and 330 to the shape estimation unit 130. The preset information may be information set to indicate which partial space is associated with which piece of object information based on the information for determining the border 310.

In step S603, the imaging information obtaining unit 120 obtains the foreground images generated by the imaging system 2 and the imaging parameters of the imaging apparatuses 20. When the installation states of the imaging apparatuses 20 remain unchanged, the imaging parameters may be obtained only once and stored in the auxiliary storage device 514. However, in some situations, the installation states of the imaging apparatuses 20 can change due to wind or contact with an obstacle. In such a case, the imaging information obtaining unit 120 can calculate imaging parameters as appropriate. The imaging information obtaining unit 120 transmits the obtained foreground images and imaging parameters to the shape estimation unit 130 and the image generation apparatus 3. The imaging information obtaining unit 120 may be configured to obtain the captured images from the imaging system 2 and transmit the captured images to the shape estimation unit 130 and the image generation apparatus 3. In such a case, the shape estimation unit 130 generates the foreground images based on the obtained captured images. Here, the foreground images are generated by the imaging apparatuses 20 or the shape estimation unit 130, using appropriate processing parameters based on the object information linked with the corresponding imaging apparatuses 20.

In step S604, the shape estimation unit 130 identifies imaging apparatuses 20 to be used for shape estimation processing based on the information indicating the partial spaces 320 and 330 and the identification numbers of the imaging apparatuses 20 linked with the respective partial spaces 320 and 330. In the present processing the shape estimation unit 130 determines whether the coordinates of the representative point of a voxel to be subjected to the shape estimation processing satisfies z>2 m, since the border 310 is set to "z=2 m". In a case where z>2 m is satisfied (YES in step S604), the shape estimation unit 130 determines that the voxel is included in the partial space 320, and the processing proceeds to step S605. In a case where z>2 m is not satisfied (NO in step S604), the shape estimation unit 130 determines that the voxel is included in the partial space 330, and the processing proceeds to step S606. The shape estimation unit 130 may be configured to determine whether the voxel to be processed is included in the partial space 320. In a case where the voxel is determined to be included in the partial space 320, the processing proceeds to step S605. In a case where the voxel is determined to not be included in the partial space 320, the processing proceeds to step S606.

In step S605, the shape estimation unit 130 determines to use the imaging apparatuses 20 having the identification numbers with which the same object information as that corresponding to the partial space 320 (here, object information "ball") is linked for the shape estimation processing.

In step S606, the shape estimation unit 130 determines to use the imaging apparatuses 20 having the identification numbers with which the same object information as that corresponding to the partial space 330 (here, object information "player") is linked for the shape estimation processing.

In step S607, the shape estimation unit 130 generates silhouette images based on the foreground images obtained from the imaging apparatuses 20 determined to be used in step S605 or S606, and performs the shape estimation processing by using the generated silhouette images. Here, the shape estimation unit 130 determines whether the voxel is part of the shape of an object by using different shape estimation parameters based on the object information associated with the partial spaces 320 and 330. For example, in a case where the imaging apparatuses 20 corresponding to "ball" are determined to be used in step S605, a shape estimation parameter of 1 is used. In a case where the imaging apparatuses 20 corresponding to "player" are determined to be used in step S606, a shape estimation parameter of 0 is used. The shape estimation unit 130 determines whether the pixel values on the silhouette images corresponding to the coordinates into which the voxel to be processed are converted in the captured image systems have a pixel value corresponding to a foreground region (in the foregoing example, a pixel value of 1). When the value of the shape estimation parameter is 0, the shape estimation unit 130 determines that the voxel to be processed is part of the shape of an object in a case where the coordinates corresponding to the voxel to be processed are determined to be included in a foreground region in all the captured imaging systems. Meanwhile, in a case where there is a captured image where the coordinates are determined to be included in a region other than a foreground region (the pixel value on the silhouette image corresponding to the coordinates is 0), the shape estimation unit 130 determines that the voxel to be processed is not part of the shape of an object. When the value of the shape estimation parameter used is 1, the shape estimation unit 130 determines that the voxel to be processed is part of the shape of an object in a case where the number of captured images where the coordinates are determined to be included in a region other than a foreground region is less than or equal to one. When the value of the shape estimation parameter used is 1, the shape estimation unit 130 determines that the voxel to be processed is not part of the shape of an object in a case where the number of captured images where the coordinates are determined to be included in a region other than a foreground region is two or more.

In step S608, the shape estimation unit 130 determines whether all the voxels in the imaging space have been processed. In a case where there is determined to be an unprocessed voxel (NO in step S608), the processing returns to step S604, and the shape estimation unit 130 performs the processing of step S604 and the subsequent steps again. In a case where all the voxels are determined to have been processed (YES in step S608), the processing proceeds to step S609.

In step S609, the shape estimation unit 130 generates shape data based on the result of the shape estimation processing, and transmits the shape data to the image generation apparatus 3. After the transmission of the shape data by the shape estimation unit 130, the processing ends.

An example of the processing performed by the shape estimation apparatus 1 has been described above. The shape estimation apparatus 1 can perform similar processing when the types of objects or the border differ(s) from the foregoing example or when there are three or more partial spaces. In such a case, in step S604, the shape estimation unit 130 determines a border or borders based on the number of partial spaces. The shape estimation unit 130 performs the shape estimation processing by using imaging apparatuses 20 having the object information corresponding to the partial space where the voxel is included, based on the determination result in step S604. The shape estimation processing can use shape estimation parameters of any given values based on the type of object and the partial space.

As described above, the space setting unit 110 according to the present exemplary embodiment sets different processing parameters to be used in the processing for generating shape data on objects in a plurality of partial spaces included in the imaging space. Such a configuration enables generation of shape data by using appropriate processing parameters for the respective partial spaces, and therefore accurate shape data on the objects can be generated throughout the imaging space.

<Method for Generating Virtual Viewpoint Image>

Processing for generating a virtual viewpoint image to be performed by the image generation apparatus 3 will be described. The image generation apparatus 3 performs processing for generating a foreground virtual viewpoint image and processing for generating a background virtual viewpoint image by using the foreground images, imaging parameters, and shape data transmitted from the shape estimation apparatus 1. The image generation apparatus 3 combines the generated foreground and background virtual viewpoint images to generate a virtual viewpoint image. Each generation process will be described below.

A method for generating a foreground virtual viewpoint image will be described. A foreground virtual viewpoint image is generated by coloring the voxels in the shape data. A method for calculating color to be applied to the voxels will be described. The image generation apparatus 3 calculates distances d from an imaging apparatus 20 to the voxels in the shape data on the surfaces of the objects based on the shape data and the imaging parameters, and generates a distance image where the calculated distances d are associated with pixel values. In addition, regarding given coordinates Xw in the imaging space, the image generation apparatus 3 converts the coordinates Xw into coordinates Xi on the captured image (distance image) by using the imaging parameter of the imaging apparatus 20 having the angle of view including the coordinates Xw. The image generation apparatus 3 also calculates a distance dx between the coordinates Xw and the imaging apparatus 20 having the angle of view including the coordinates Xw. The image generation apparatus 3 compares the distance d with the distance dx by referring to the pixel value at the coordinates Xi on the distance image. In a case where a difference between the distances d and dx is less than or equal to a predetermined threshold, the coordinates Xw are determined to be visible to the imaging apparatus 20. In the following description, the predetermined threshold will be referred to as a visibility determination parameter. In a case where the coordinates Xw are visible, the pixel value at the coordinates Xi on the captured image corresponding to the coordinates Xw is calculated as the color at the surface of an object.

By performing the foregoing processing on a plurality of imaging apparatuses 20, a plurality of sets of coordinates determined to be visible can be identified for a voxel in the shape data on the surface of an object. The image generation apparatus 3 determines the color of the voxel by averaging (i.e., blending) the pixel values corresponding to the identified plurality of sets of coordinates, and applies the color to the voxel. The image generation apparatus 3 performs such processing on all the voxels in the shape data, to color the shape data and generate a foreground virtual viewpoint image. The visibility determination parameter used in the foregoing processing may be a value different from one partial space to another. The smaller the value of the visibility determination parameter, the fewer sets of coordinates are determined to be visible. This can provide the effect of reducing the number of colors to be blended and making the resulting color vivid. For example, when shape data in a partial space corresponding to "player" is colored, players can be vividly colored by a setting by which the visibility determination parameter is set to a small value, and therefore a high-quality virtual viewpoint image can be generated. Meanwhile, the greater the value of the visibility determination parameter, the more sets of coordinates are determined to be visible and the more colors are blended. In a case where, for example, an object is small in size and can move at high speed, like a ball, the exact color of the object does not need to be calculated. In coloring shape data in a partial space corresponding to "ball", the visibility determination parameter is therefore set to a large value.

The visibility determination parameter may have the same value throughout the imaging space. The color calculation method is not limited to the foregoing, and various methods may be used. Examples include using the color of the captured image obtained by the imaging apparatus 20 closest to a specified virtual viewpoint. In the present exemplary embodiment, the foregoing processing is performed by using imaging apparatuses 20 having an angle of view where the coordinates to be processed are included among all the imaging apparatuses 20. However, only imaging apparatuses 20 corresponding to the partial space where the coordinates to be processed are included may be used.

Next, a method for generating a background virtual viewpoint image will be described. The background virtual viewpoint image is generated by using three-dimensional shape data on the background. A stadium computer graphics (CG) model generated in advance and stored in a storage device is used as the three-dimensional shape data on the background. The CG model represents the shape of the background using a plurality of surfaces. By comparing the normal vector of a surface with imaging directions of the imaging apparatuses 20, the image generation apparatus 3 identifies an imaging apparatus 20 that has an angle of view where the surface is included and that is most directly opposed to the surface. The image generation apparatus 3 generates a texture image corresponding to the surface by using the captured image obtained from the identified imaging apparatus 20, and applies the texture image to the surface by an existing texture mapping technique. The image generation apparatus 3 performs such processing on each of the surfaces, to generate a background virtual viewpoint image.

The image generation apparatus 3 generates a virtual viewpoint image by combining the foreground and background virtual viewpoint images generated by the foregoing processing. The image generation apparatus 3 also accepts user operations for specifying the position of the virtual viewpoint and the line of sight direction from the virtual viewpoint, from an input device inside the image generation apparatus 3 or one connected outside the image generation apparatus 3. Alternatively, the image generation apparatus 3 obtains information for specifying the virtual viewpoint from a storage device. By such processing, the image generation apparatus 3 can generate a virtual viewpoint image seen from a specified viewpoint and display the virtual viewpoint image on the display apparatus 4.

Second Exemplary Embodiment

The present exemplary embodiment describes a shape estimation apparatus 7 that generates shape data by using a plurality of imaging systems. A hardware configuration, functional configuration, and processing similar to those of the first exemplary embodiment are denoted by the same reference numerals. A redundant description will be omitted.

Figure 7:
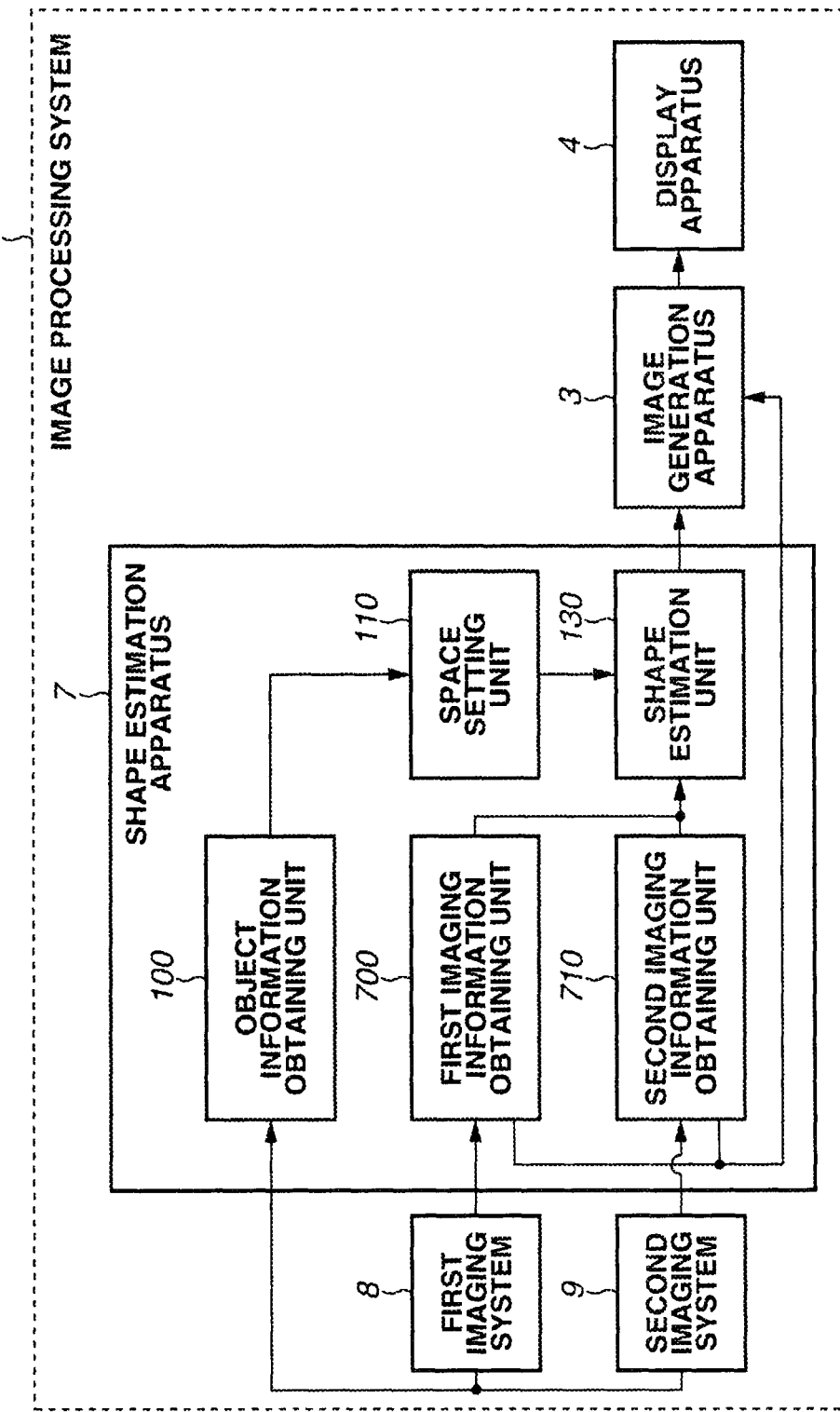
FIG. 7 is a diagram for describing a configuration of an image processing system including a shape estimation apparatus.

FIG. 7 is a diagram for describing a configuration of an image processing system 1100 including the shape estimation apparatus 7. The image processing system 1100 includes the shape estimation apparatus 7, a first imaging system 8, a second imaging system 9, an image generation apparatus 3, and a display apparatus 4. The shape estimation apparatus 7 has a similar hardware configuration to that of the shape estimation apparatus 1 according to the first exemplary embodiment. A redundant description thereof will thus be omitted.

Figure 8:
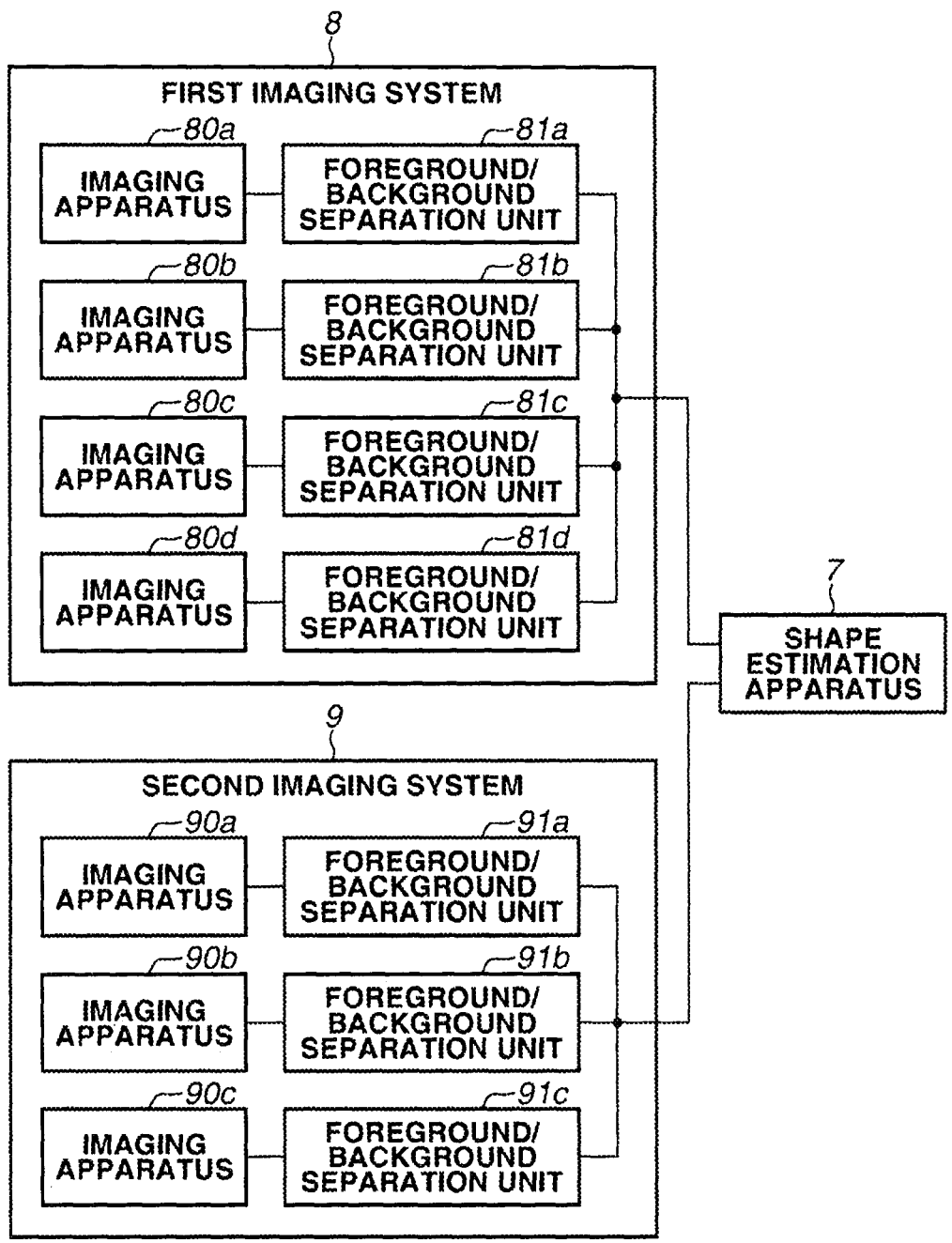
FIG. 8 is a diagram for describing an example of a configuration of a first imaging system and a second imaging system.

The first and second imaging systems 8 and 9 are systems each including a plurality of imaging apparatuses having the same object information. FIG. 8 is a diagram for describing an example of a configuration of the first and second imaging systems 8 and 9. FIG. 8 illustrates a first imaging system 8 including four imaging apparatuses 80a to 80d and a second imaging system 9 including three imaging apparatuses 90a to 90c. The numbers of imaging apparatuses included in the respective imaging systems are not limited thereto. The imaging apparatuses 80a to 80d included in the first imaging system 8 have the same object information (for example, "player"), and are installed to mainly capture an image of an object indicated by the object information. Similarly, the imaging apparatuses 90a to 90c included in the second imaging system 9 have the same object information (for example, "ball"), and installed to mainly capture an image of an object indicated by the object information. The imaging systems 8 and 9 generate foreground images by separation units (foreground/background separation units) 81a to 81d and 91a to 91c in the respective systems, and transmit the foreground images to the shape estimation apparatus 7. In the following description, the imaging apparatuses 80a to 80d and the imaging apparatuses 90a to 90c will be referred to simply as imaging apparatuses 80 and imaging apparatuses 90, respectively, unless a specific distinction is made.

Returning to FIG. 7, a functional configuration of the shape estimation apparatus 7 will be described. The shape estimation apparatus 7 includes an object information obtaining unit 100, a space setting unit 110, a first imaging information obtaining unit 700, a second imaging information obtaining unit 710, and a shape estimation unit 130. Processing units different from those of the shape estimation apparatus 1 according to the first exemplary embodiment will now be described.

The first imaging information obtaining unit 700 obtains the foreground images generated by the first imaging system 8 and the imaging parameters of the imaging apparatuses 80 included in the first imaging system 8. The second imaging information obtaining unit 710 obtains the foreground images generated by the second imaging system 9 and the imaging parameters of the imaging apparatuses 90 included in the second imaging system 9. The first and second imaging information obtaining units 700 and 710 each transmit the obtained foreground images and imaging parameters to the shape estimation unit 130 and the image generation apparatus 3.

Figure 9:
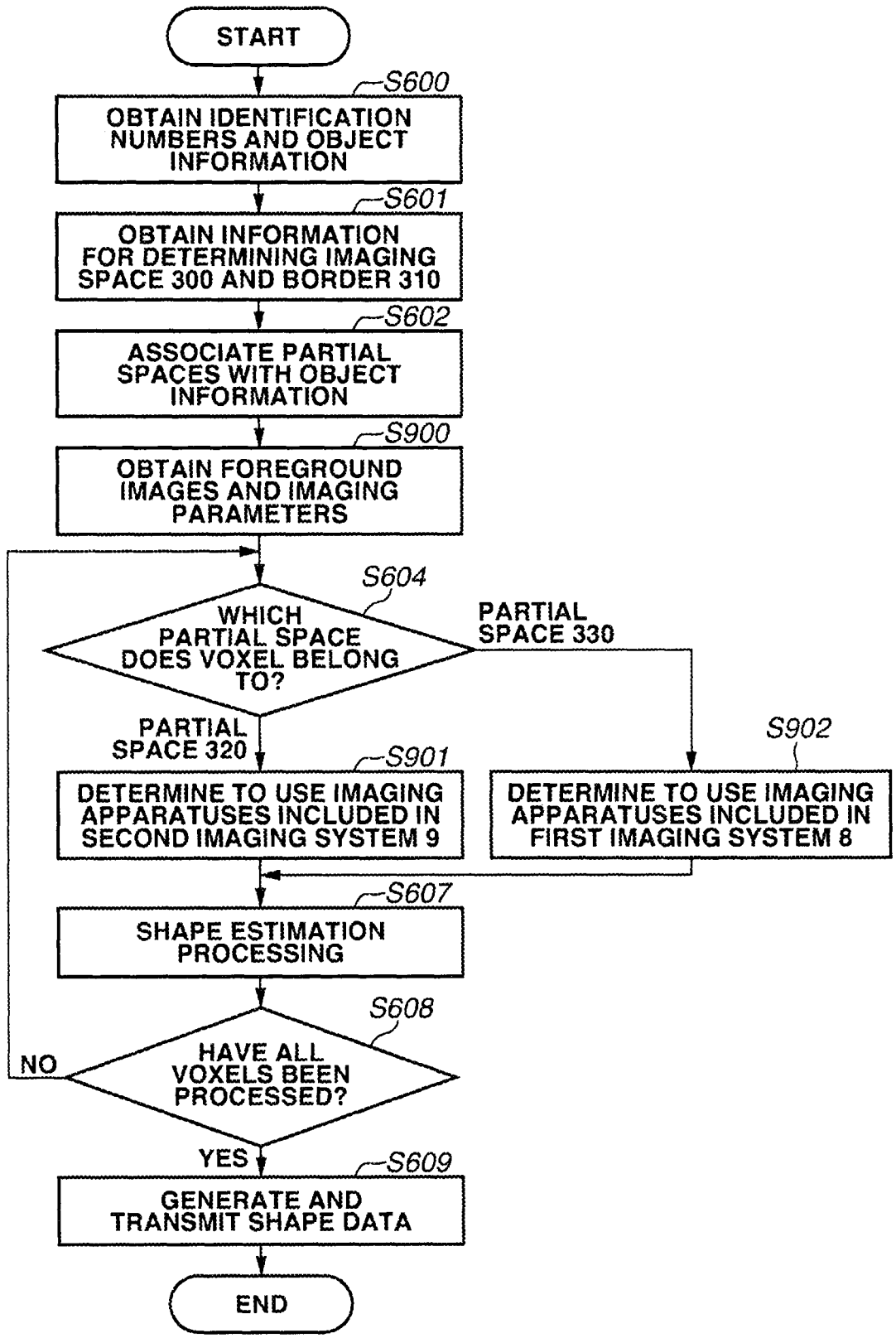
FIG. 9 is a flowchart for describing an example of processing performed by the shape estimation apparatus.

FIG. 9 is a flowchart for describing processing performed by the shape estimation apparatus 7. The processing of steps S900, S901, and S902 is performed instead of that of steps S603, S605, and S606 in the flowchart illustrated in FIG. 6. In the following description, like FIG. 6, the processing of the shape estimation apparatus 7 in the case where the partial spaces 320 and 330 included in the imaging space 300 illustrated in FIG. 5A are associated with object information indicating "ball" and "player", respectively, will be described. The imaging apparatuses 80 included in the first imaging system 8 will be described to have the object information "player", and the imaging apparatuses 90 included in the second imaging system 9 will be described to have the object information "ball". Differences from the processing illustrated in FIG. 6 will be described below.

In step S900, the first imaging information obtaining unit 700 obtains the foreground images generated by the first imaging system 8 and the imaging parameters of the imaging apparatuses 80. The second imaging information obtaining unit 710 obtains the foreground images generated by the second imaging system 9 and the imaging parameters of the imaging apparatuses 90. The first and second imaging information obtaining units 700 and 710 each transmit the obtained foreground images and imaging parameters to the shape estimation unit 130.

In step S604, determination of which partial space includes a voxel as in FIG. 6 is performed. In a case where the border 310 is set to "z=2 m", the shape estimation unit 130 determines whether the coordinates of the representative point of the voxel to be subjected to the shape estimation processing satisfies z>2 m. In a case where z>2 m is satisfied (YES in step S604), the shape estimation unit 130 determines that the voxel is included in the partial space 320, and the processing proceeds to step S901. In a case where z>2 m is not satisfied (NO in step S604), the shape estimation unit 130 determines that the voxel is included in the partial space 330, and the processing proceeds to step S902. In step S901, the shape estimation unit 130 determines to use the imaging apparatuses 90 included in the second imaging system 9 in the shape estimation processing, since the object information corresponding to the partial space 320 is "ball". In step S902, the shape estimation unit 130 determines to use the imaging apparatuses 80 included in the first imaging system 8 in the shape estimation processing, since the object information corresponding to the partial space 330 is "player".

Subsequently, the shape estimation processing is performed by using different shape estimation parameters for the respective partial spaces as in the first exemplary embodiment, to generate shape data on objects. Like the first exemplary embodiment, the processing illustrated in FIG. 9 is also applicable in a case where the types of objects or the border differ(s) from the foregoing example or when there are three or more partial spaces. As described in the present exemplary embodiment, the use of the imaging systems each including the imaging apparatuses 20 having the same object information facilitates identifying the imaging apparatuses 20 to be used for the shape estimation processing. Since the imaging apparatuses 20 included in each imaging system have the same object information, the same processing parameters can be assigned in each imaging system. While in the present exemplary embodiment the image processing system 1100 is described to include two imaging systems, any number of imaging systems may be included based on the types of objects.

Modifications of First and Second Exemplary Embodiments

In the foregoing exemplary embodiments, examples where the imaging space is divided into a plurality of partial spaces based on a border or borders and processing parameters are set for each partial space have been described. Now, another example of the settings of the processing parameters other than the foregoing will be described. For example, in a case where images of an object across the border 310 in the imaging space 300 illustrated in FIG. 5A are captured, shape data is generated by using different processing parameters for the voxels included in the partial space 320 and the voxels included in the partial space 330. This can distort the generated shape of the object near the border 310. To solve such an issue, for example, the space setting unit 110 sets the processing parameters so that the processing parameters change gently near the border 310. For example, in a case where the border 310 is set to z=3 m, the space setting unit 110 sets a shape estimation parameter of 1 for a space (hereinafter, referred to as a border space) of z=3±0.3 m near the border 310. The space setting unit 110 also sets a shape estimation parameter of 2 for the partial space 320, and a shape estimation parameter of 0 for the partial space 330. Such a parameter gradient can reduce distortion of the shape data near the border 310. The setting of the border space is not limited to the foregoing values.

In a case where whether an object lies across a border can be determined based on the position of the object during the processing for generating shape data, the shape data near the border may be generated by using the same processing parameters. In such a case, for example, the processing parameters corresponding to the partial space where a larger part of the object lying across the border is included are used.

As described above, according to the first and second exemplary embodiments, the processing related to the generation of shape data can be properly performed throughout the imaging space.

Third Exemplary Embodiment

In the first and second exemplary embodiments, a configuration for performing the shape estimation processing by using imaging apparatuses 20 linked with object information has been described. Japanese Patent Laid-Open No. 2008-191072 discusses generating a list of imaging apparatuses capable of observing each of partial regions (elements) constituting a three-dimensional space that is a three-dimensional shape estimation region. Japanese Patent Laid-Open No. 2008-191072 also discusses performing shape estimation processing by using only imaging apparatuses identified based on the list.

The use of the foregoing information indicating the imaging apparatuses to be used for shape estimation (hereinafter, referred to as shape estimation information) reduces processing load since the shape estimation processing can be performed based only on the images from specific imaging apparatuses among a plurality of imaging apparatuses. However, since the shape estimation information is generated by determining which imaging apparatuses among all the imaging apparatuses can observe each one of the elements constituting the estimation region, the following issue can occur. That is, the load of the processing for generating the shape estimation information can increase with increase in the number of elements constituting the three-dimensional estimation region or the number of imaging apparatuses. In other words, the load of processing related to shape estimation can eventually fail to be reduced.

In a third exemplary embodiment, a configuration for reducing the processing load in the case where imaging apparatuses are identified based on shape estimation information will be described. In the third exemplary embodiment and a fourth exemplary embodiment to be described below, imaging apparatuses will be referred to as cameras. In the third and fourth exemplary embodiments, the imaging space according to the first and second exemplary embodiments will be rephrased as a shape estimation region, and a partial space as a region, whereas there is no substantial difference in meaning therebetween.

In the present exemplary embodiment, the processing load for three-dimensional shape estimation is reduced by dividing the shape estimation region that is a three-dimensional space where the three-dimensional shapes of objects are estimated into a first region and a second region, and limiting a plurality of cameras to be used for shape estimation in each region. For that purpose, in the first region, shape estimation information that is information indicating cameras corresponding to images used for shape estimation is generated for each element constituting the first region based on the states of the cameras. In the second region, information common between the elements constituting the second region is set as shape estimation information. The cameras to be used for estimation are thus limited in both the first and second regions based on the shape estimation information. Details of the shape estimation information will be described below.

In the present exemplary embodiment, unlike a configuration where shape estimation information is generated element by element for all the elements constituting the three-dimensional space, shape estimation information is generated element by element in only the first region that is a partial region of the three-dimensional space. Such a configuration can reduce the load of the processing for generating the shape estimation information. According to the present exemplary embodiment, the processing load for estimating three-dimensional shapes can thus be reduced and the load of the processing for generating the shape estimation information can be reduced as well.

The shape estimation information does not need to be generated element by element for all the elements included in the first region. A piece of shape estimation information may be generated for several elements included in the first region. Alternatively, in the first region, shape estimation information may be generated element by element for some of the elements, and a piece of shape estimation information may be generated for a group of several other elements. Even in such cases, the load of the processing for generating shape estimation information can be reduced, compared to the configuration where shape estimation information is generated element by element for all the elements constituting the three-dimensional space. In the present exemplary embodiment, an example where shape estimation information is generated for each of the elements included in the first region will be described.

The three-dimensional space includes a plurality of elements. The first and second regions each include a plurality of elements. Examples of the elements include voxels. However, the elements are not limited thereto as long as groups of points are represented.

The three-dimensional space may be divided into three or more regions. In a case where, for example, a third region is set in addition to the foregoing first and second regions, the load of the processing related to shape estimation can be reduced by setting shape estimation information for the first and second regions even without setting shape estimation information for the third region. Shape estimation information may further generated for each of the elements constituting the third region, or common shape estimation information may be set for the elements. In such cases, the load of the processing related to shape estimation is further reduced.

An image processing system according to the present exemplary embodiment generates a virtual viewpoint image expressing a view from a specified virtual viewpoint based on a plurality of captured images captured in different directions by a plurality of cameras, the states of the cameras, and the virtual viewpoint.

The plurality of cameras captures images of an imaging region in a plurality of directions. Example of the imaging region is a space surrounded by a plane and a given height in a rugby stadium. The imaging region may or may not correspond to the foregoing three-dimensional space where the three-dimensional shapes of objects are estimated. In other words, the three-dimensional space may be all or part of the imaging region. The plurality of cameras is installed at respective different positions and in respective different directions to surround the imaging region, and synchronously captures images. The plurality of cameras does not need to be disposed all around the imaging region, and may be disposed only in some directions of the imaging region depending on limitations on installation locations. The number of cameras is not limited in particular. For example, in a case where the imaging region is a rugby stadium, several tens to several hundreds of cameras may be installed around the stadium.

The plurality of cameras may include cameras having different angles of view, such as telescopic cameras and wide angle cameras. For example, telescopic cameras are used to capture images of players at high resolution so that the resolution of the generated virtual viewpoint image also improves. Since a ball moves over a wide range, capturing images of the ball with wide angle cameras can reduce the number of cameras. The installation positions of the wide angle cameras and telescopic cameras are not limited in particular as long as images of the imaging region are captured. Telescopic cameras may be disposed to capture images of a region in the imaging region corresponding to the first region in the three-dimensional space for estimating three-dimensional shapes, and wide angle cameras may be disposed to capture images of a region corresponding to the second region. Wide angle cameras may be disposed to capture images of the region corresponding to the first region.

The cameras are synchronized with a single piece of time information in the real world. Imaging time information is attached to each frame of the captured images.

The states of the cameras refer to states such as the positions, orientations (directions or imaging directions), focal lengths (angles of view), optical centers, and distortion of the cameras. The positions and orientations (directions or imaging directions) of the cameras may be controlled by the cameras themselves or by camera platforms for controlling the positions and orientations of the cameras. In the following description, the states of the cameras will be referred to as camera parameters, whereas the camera parameters may include parameters controlled by other devices such as a camera platform. The camera parameters related to the positions and orientations (directions or imaging directions) of the cameras are external parameters. The camera parameter related to the focal lengths, optical centers, and distortion of the cameras are internal parameters. The positions and orientations of the cameras are expressed in a coordinate system with one origin and three orthogonal axes (referred to as a global coordinate system).

Virtual viewpoint information that is used to generate a virtual viewpoint image is information indicating the position and direction of the virtual viewpoint. Specifically, the virtual viewpoint information includes parameters expressing the three-dimensional position of the virtual viewpoint and parameters expressing the orientation of the virtual viewpoint in pan, tilt, and roll directions. The virtual viewpoint information is not limited to the foregoing contents. For example, the parameters included in the virtual viewpoint information may include one expressing the size of the field of view (angle of view) from the virtual viewpoint. The virtual viewpoint information may include parameters for a plurality of frames. In other words, the virtual viewpoint information may be information including parameters that correspond to a respective plurality of frames constituting a virtual-viewpoint moving image and indicate the positions and directions of the virtual viewpoint at a respective plurality of successive points in time.

As described above, a virtual viewpoint image is generated, for example, by the following method. Initially, a plurality of cameras captures images in different directions to obtain a plurality of images (camera images). Next, foreground images and background images are obtained from the plurality of camera images. The foreground images are obtained by extracting foreground regions corresponding to objects such as a person and a ball. The background images are obtained by extracting background regions other than the foreground regions. The foreground and background images have texture information (such as color information). Foreground models representing the three-dimensional shapes of the objects and texture data for coloring the foreground models are generated based on the foreground images. Texture data for coloring a background model representing the three-dimensional shape of the background, such as a stadium, is also generated based on the background images. The texture data is mapped onto the foreground and background models, and rendering is performed based on the virtual viewpoint indicated by the virtual viewpoint information, whereby a virtual viewpoint image is generated. The method for generating a virtual viewpoint image is not limited thereto, and various methods may be used. Examples include a method for generating a virtual viewpoint image by projective transformation of the captured images without using a foreground or background model.

[Configuration]

A shape estimation apparatus that is used in the image processing system according to the third exemplary embodiment will be described with reference to the drawings.

Figure 10:
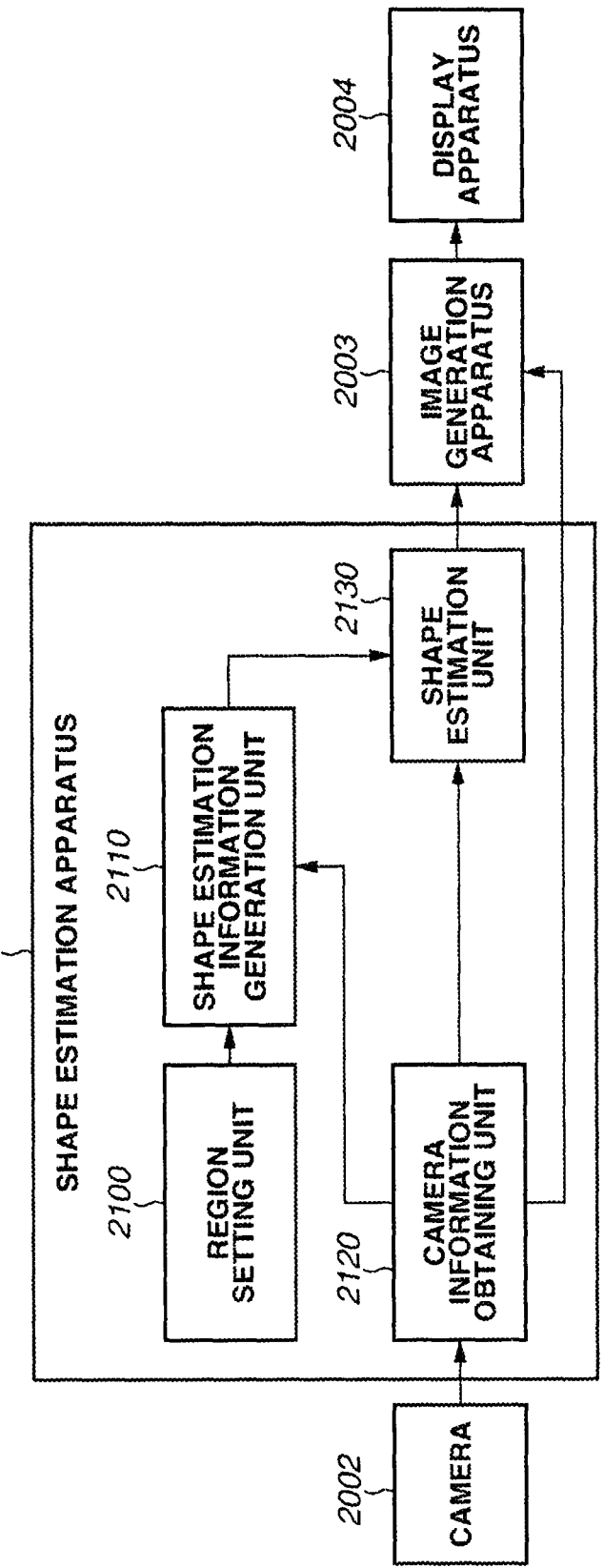
FIG. 10 is a diagram illustrating an example of an apparatus configuration of an image processing system.

FIG. 10 is a diagram illustrating the image processing system according to the present exemplary embodiment. The image processing system includes a shape estimation apparatus 2001, a plurality of cameras 2002, and an image generation apparatus 2003. The image processing system further includes a display apparatus 2004. In the present exemplary embodiment, the shape estimation apparatus 2001 is connected to the plurality of cameras 2002, the image generation apparatus 2003, and the display apparatus 2004. The shape estimation apparatus 2001 obtains images captured by the plurality of cameras 2002. The shape estimation apparatus 2001 then estimates the three-dimensional shapes of objects based on the images obtained from the plurality of cameras 2002. While FIG. 10 illustrates only one camera 2002, the image processing system according to the present exemplary embodiment includes a plurality of cameras 2002.

Each of the plurality of cameras 2002 has an identification number (camera number) for identifying among the cameras 2002. The cameras 2002 may each include other functions, such as a function of extracting a foreground image from a captured image, and hardware (circuit or device) for implementing the functions. The camera numbers may be set based on the installation positions of the cameras 2002 or based on other criteria.

The image generation apparatus 2003 obtains information indicating the three-dimensional shapes of the objects from the shape estimation apparatus 2001, and generates a virtual viewpoint image. To generate a virtual viewpoint image, the image generation apparatus 2003 accepts specification of the virtual viewpoint information, and generates the virtual viewpoint image based on the virtual viewpoint information. For example, a user (operator) specifies the virtual viewpoint information by using an input unit such as a joystick, a jog dial, a touch panel, a keyboard, and/or a mouse. The specification of the virtual viewpoint information is not limited thereto. The virtual viewpoint information may be automatically specified by object recognition. The generated virtual viewpoint image is output to the display apparatus 2004. The display apparatus 2004 obtains the virtual viewpoint image from the image generation apparatus 2003, and outputs the virtual viewpoint image by using a display device such as a display.

A configuration of the shape estimation apparatus 2001 will be described. The shape estimation apparatus 2001 includes a region setting unit 2100, a shape estimation information generation unit 2110, a camera information obtaining unit 2120, and a shape estimation unit 2130.

The region setting unit 2100 sets a first region and a second region in the three-dimensional space that is the shape estimation region. The first region is where shape estimation information is generated element by element. The second region is where shape estimation information common between elements is set. To set such regions, the region setting unit 2100 obtains border information indicating a border between the two regions. The regions to be set will be specifically described with reference to the examples of FIGS. 5A and 5B. In FIGS. 5A and 5B, the shape estimation region 300 illustrated by the broken lines is expressed in a global coordinate system that is set in obtaining the external and internal parameters of the cameras 2002 to be described below. The global coordinate system includes three orthogonal axes, namely, an x-axis, a y-axis, and a z-axis. A ground 301 such as a rugby ground corresponds to an xy plane defined by the x- and y-axes. The z-axis is defined in a direction 302 perpendicular to the ground 301. The ground 301 is at z=0. When the border information indicating a border 310 is expressed by only height information (information in the z-axis direction), the shape estimation region 300 is divided as illustrated in FIG. 5A. The region where the z coordinate has a value greater than that indicated by the height information on the z-axis is set as a second region 320. The region between z=0 and where the z coordinate has a value less than or equal to that indicated by the height information on the z-axis is set as a first region 330.

Which of the plurality of regions divided based on the height information is set as a second region and which is set as a first region may be determined as appropriate. For example, the first and second regions may be set based on the numbers of cameras 2002 to capture images of the respective corresponding regions. Different numbers of cameras 2002 can be used to capture images of the respective plurality of regions included in the image capturing target region for the plurality of cameras 2002. An example will now be described. In the case of soccer or rugby, there is a plurality of players and referees in a region near the ground. To increase the estimation accuracy of the three-dimensional shapes of the players and referees, a large number of cameras 2002 are used to capture images of the region near the ground from various positions and in various directions. Meanwhile, in a region far from the ground, such as 10 m above the ground, images are captured of only the ball. In addition, the ball is less likely to be blocked by other objects. A certain level of shape estimation accuracy can thus be maintained even with a small number of cameras 2002. In such a case, the region in the shape estimation region corresponding to the region for fewer cameras 2002 to capture images of may be set as the second region. This makes the number of cameras 2002 to be identified by the set shape estimation information smaller than the number of cameras 2002 in a case where the other region is set as the second region. As a result, an effect of further reducing the load of the shape estimation processing can be obtained.

Alternatively, the first and second regions may be set based on the camera parameters of the cameras 2002 capturing images of the regions. The cameras 2002 capturing images of the respective plurality of regions included in the image capturing target region for the plurality of cameras 2002 can have different camera parameters. In the foregoing example of soccer or rugby, telescopic cameras can be used to capture images of the players and referees at high resolution in the region near the ground. Meanwhile, wide angle cameras can be used to capture images of the movement of the object, i.e., ball about 10 m above the ground with fewer cameras. The region in the shape estimation region corresponding to where images are captured by wide angle cameras may thus be set as the second region. To determine that a wide angle camera is used, the border information may be set based on the internal parameters of the cameras 2002.

Alternatively, the first and second regions may be set based on the numbers of objects included in the regions. For example, a plurality of regions included in the image capturing target region for the plurality of cameras 2002 may include different numbers of objects. In the foregoing example of soccer or rugby, the region near the ground include a lot of objects such as the players, referees, and ball. Meanwhile, the object included in the region approximately 10 m above the ground is the ball. A large number of cameras 2002 can thus be used to capture images of the region near the ground while fewer cameras 2002 are used to capture images of the region approximately 10 m above the ground. The region in the shape estimation region corresponding to where the number of objects is small may be set as the second region. The region in the shape estimation region corresponding to where the number of objects is large may be set as the first region. The border information may thus be set based on information about the numbers of objects. The numbers of objects included in the regions are estimated based on the type of event.

When a border 410 is represented by rectangular solid information (information indicated by the coordinates of eight positions), the shape estimation region 300 is divided as illustrated in FIG. 5B. The region outside the rectangular solid defined by the coordinates indicating the border 410 is set as a second region 420. The region inside the rectangular solid is set as a first region 430. Even in such an example, which of the plurality of divided regions is set as the second region and which is set as the first region may be determined as appropriate. For example, the first and second regions may be set based on the numbers of cameras 2002 to capture images of the regions. For example, in a case where a region where an important scene is likely to occur is known, like a goal scene in soccer, images of that region can be captured by a large number of cameras 2002 while images of other regions are captured by fewer cameras 2002 to reduce the total number of cameras 2002. The border information may thus be set based on event information (for example, information about the type of event such as soccer and rugby).

The border information that is used to set the regions is stored in a memory inside the shape estimation apparatus 2001. Alternatively, the border information may be obtained from an external apparatus.

Figure 11:
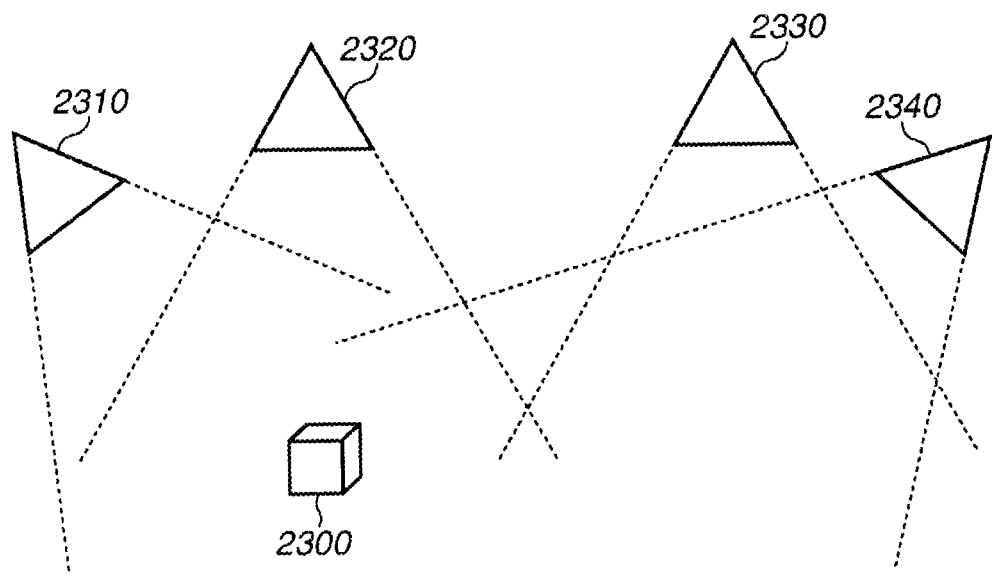
FIG. 11 is a diagram for describing shape estimation information generated based on a positional relationship between cameras and a voxel.

The shape estimation information generation unit 2110 generates shape estimation information for each element constituting the first region. In the following description, voxels will be described as an example of the elements expressing a three-dimensional shape. However, this is not restrictive. The shape estimation information is information indicating the cameras 2002 to be used in the processing for estimating the three-dimensional shapes of objects. In other words, the shape estimation information is information indicating the angles of view of which cameras 2002 include a voxel that is an element constituting a three-dimensional shape. For example, suppose that a voxel 2300 and cameras 2310 to 2340 (broken lines extending from the cameras indicate the angles of view) are disposed in the space of the global coordinate system as illustrated in FIG. 11. In such a case, the shape estimation information can be determined in the following manner. The center coordinates of the voxel 2300 or the coordinates of the eight vertices of the voxel 2300 are converted into coordinates in a camera image coordinate system of the camera 2310 by using the camera parameters of the camera 2310. In a case where the converted x coordinate(s) in the camera image coordinate system is/are greater than or equal to 0 and less than an x coordinate corresponding to the lateral width of the camera image, and the converted y coordinate(s) is/are greater than or equal to 0 and less than a y coordinate corresponding to the vertical width of the camera image, the voxel 2300 is determined to be included in the angle of view. Shape estimation information about each voxel 2300 is calculated by performing similar calculations on the other cameras. A state in which the voxel 2300 is included in the angle of view of a camera will hereinafter be referred to as being visible, and a state in which the voxel 2300 is not included in the angle of view of a camera as being invisible. In other words, the state in which the voxel 2300 is included in the angle of view of a camera means that the region corresponding to the voxel 2300 in the image capturing target region for the plurality of cameras is included in the angle of view of the camera, i.e., an image of the region is captured by the camera.

The shape estimation information is expressed by a variable having bits as many as or more than the number of cameras 2002. For example, a bit value of 0 represents being invisible, and 1 visible. In the case of FIG. 11, the shape estimation information is expressed by a variable having four or more bits since there are four cameras. The least significant bit indicates the visibility of the first camera 2310. In the example of FIG. 11, the voxel 2300 is visible to the camera 2310, visible to the camera 2320, invisible to the camera 2330, and visible to the camera 2340. The shape estimation information about the voxel 2300 is expressed as "1011".

The shape estimation information generation unit 2110 sets predetermined shape estimation information for the second region. Unlike the shape estimation information set for the first region, the shape estimation information set for the second region is common among all the elements constituting the second region, instead of respective different pieces of information being generated for the elements constituting the second region. Specifically, this shape estimation information is information obtained by setting the bits corresponding to the camera numbers of cameras 2002 determined to be used for the shape estimation in the second region among the plurality of cameras 2002 to 1. Which cameras 2002 are to be used for the shape estimation may be set as appropriate. For example, cameras 2002 specialized in capturing an image of the object included in the second region may be set to be used for the shape estimation in the second region. Only wide angle cameras among the plurality of cameras 2002 may be set to be used for the shape estimation in the second region. In the case of the second region 320 illustrated in FIG. 5A, only the cameras 2002 that capture images of the region in the imaging region corresponding to the second region 320 may be set to be used for the shape estimation in the second region 320. In other words, for the second region 320, the shape estimation information generation unit 2110 sets information indicating the cameras 2002 that captures images of the region in the imaging region corresponding to the second region 320 as the shape estimation information. In the following description, cameras specialized in capturing images of the object included in the second region 320 are set to be used for the shape estimation in the second region 320. A specialized camera refers to a camera of which the angle of view is adjusted to capture an image of the specific object, or a camera of which internal processing on a captured image is adjusted to the specific object. The shape estimation information set for the second region 320 may have a data format similar to or different from that of the shape estimation information generated for each voxel in the first region 330.

The shape estimation information generation unit 2110 may generate shape estimation information for the second region. Here, the shape estimation information is not generated element by element but can be common within the second region regardless of the elements. Such a configuration can reduce the load of the processing for generating the shape estimation information, compared to the case where the shape estimation information is generated element by element even in the second region. The shape estimation information generation unit 2110 may generate the shape estimation information for the second region based on the camera parameters of the cameras 2002.

The camera information obtaining unit 2120 obtains a plurality of captured images captured by the plurality of cameras 2002. The camera information obtaining unit 2120 may obtain a plurality of foreground images from the plurality of captured images, or obtain foreground images from the plurality of cameras 2002. The camera information obtaining unit 2120 further obtains the camera parameters of the cameras 2002. The camera information obtaining unit 2120 may calculate the camera parameters of the cameras 2002. For example, the camera information obtaining unit 2120 calculates the camera parameters by calculating corresponding points from the plurality of captured images, optimizing the corresponding points to minimize errors of when the corresponding points are projected upon the cameras 2002, and calibrating the cameras 2002. Any existing technique may be used for calibration. The camera parameters may be obtained synchronously with the captured images, obtained in a preparation phase, or obtained as appropriate in a manner asynchronous with the captured images.

The shape estimation unit 2130 estimates the three-dimensional shapes of the objects based on the captured images and the camera parameters of the cameras 2002 obtained by the camera information obtaining unit 2120, the first and second regions of the shape estimation region set by the region setting unit 2100, and the shape estimation information associated with the regions. In a case where foreground images are obtained by the camera information obtaining unit 2120, the shape estimation unit 2130 may estimate the three-dimensional shapes by using the foreground images instead of the captured images.

The shape estimation apparatus 2001 has a similar hardware configuration to that of the shape estimation apparatus 1 according to the first exemplary embodiment illustrated in FIG. 2.

[Operation Flow]

Processing performed by the shape estimation apparatus 2001 will be described with reference to the flowchart illustrated in FIG. 12. The following processing is performed by the CPU 511 reading a program stored in the ROM 512 and executing the program.

In step S2500, the camera information obtaining unit 2120 obtains the camera parameters from the cameras 2002. The camera information obtaining unit 2120 may calculate the camera parameters instead. The camera parameters do not need to be calculated each time captured images are obtained, and may be calculated at least once before shape estimation. The obtained camera parameters are output to the shape estimation information generation unit 2110, the shape estimation unit 2130, and the image generation apparatus 2003.

In step S2510, the region setting unit 2100 obtains border information stored in the auxiliary storage device 514. Based on the border information, for example, the region setting unit 2100 divides the shape estimation region 300 as illustrated in FIG. 5A to set the first region 330 and the second region 320. Suppose that only height information of z=2 m is set as the border information to limit the cameras 2002 to be used to estimate the three-dimensional shapes of the ball above and the objects on the ground. While the region setting unit 2100 obtains the border information from the auxiliary storage device 514, the user may input border information by using a GUI provided by the display unit 517 and the operation unit 518, and the region setting unit 2100 may obtain the border information based on the input value(s). In a case where no border information is successfully obtained, the region setting unit 2100 sets the shape estimation region 300 as the first region 330. In such a case, similar processing to that on the first region 330 is subsequently performed on the entire shape estimation region 300 without the processing on the second region 320.

In step S2520, to identify cameras 2002 to be used for shape estimation, the shape estimation information generation unit 2110 sets shape estimation information stored in the auxiliary storage device 514 for the second region 320. The shape estimation information may be obtained simultaneously when the border information is obtained in step S2510. In such a case, for example, the shape estimation information may be described in the same file as the border information is. Alternatively, the shape estimation information generation unit 2110 may set the shape estimation information based on values input by the user using a GUI. In a case where there are 40 cameras 2002, the 32nd to 40th bits of the shape estimation information are set to a value of 1, and the other bits are set to a value of 0, the shape estimation information indicates that only the 32nd to 40th cameras 2002 are to be used during the shape estimation in the second region 320. In other words, the shape estimation information indicates that eight of the 40 cameras 2002 are used during the shape estimation in the second region 320. The eight cameras 2002 are specialized in capturing images of the object in the second region 320.

In step S2530, the shape estimation information generation unit 2110 generates shape estimation information about each voxel constituting the first region 330. The shape estimation information generation unit 2110 initially divides the first region 330 into a set of voxels having a preset voxel size. Each voxel has integer coordinate values in the x, y, and z directions, and the shape estimation information generation unit 2110 uniquely specifies a voxel by specifying the coordinate values. The shape estimation information generation unit 2110 determines shape estimation information about the specified voxel. Initially, the shape estimation information generation unit 2110 initializes all the bit values of the shape estimation information corresponding to all the voxels to 0. The shape estimation information generation unit 2110 then convers the representative coordinates of each voxel into the camera image coordinate systems of all the cameras 2002. In a case where the voxel is calculated to be included in the angle of view of an nth camera 2002, the shape estimation information generation unit 2110 determines that the voxel is visible to the nth camera 2002, and sets the nth bit value of the shape estimation information about the voxel to 1. Whether a voxel is visible is determined as described with reference to FIG. 11. The shape estimation information generation unit 2110 does not need to generate the shape estimation information by using all the cameras 2002. For example, the shape estimation information generation unit 2110 may generate the shape estimation information by using the cameras 2002 other than those to be used for the shape estimation in the second region 320. In such a case, the bit values at the bit positions corresponding to the camera numbers of the cameras 2002 used for the shape estimation in the second region 320 can be set to 0.

The shape estimation information generation unit 2110 generates the shape estimation information corresponding to each one of the voxels constituting the first region 330 by performing the foregoing processing on all the voxels. In a case where hierarchical shape estimation is performed by using a spatial multiresolution representation such as an octal tree, the shape estimation information generation unit 2110 may generate shape estimation information, for example, level by level and voxel by voxel in voxel sizes at the respective levels. Even in a case where such hierarchical shape estimation is performed, shape estimation information may be generated only at a specific level or levels.

In step S2540, the camera information obtaining unit 2120 obtains a plurality of captured images from the plurality of cameras 2002, and extracts silhouette images. The extracted silhouette images are output to the shape estimation unit 2130.

A silhouette image is an image showing the silhouette of an object or objects. Specifically, a silhouette image is an image having a pixel value of 255 in areas where objects are, and a pixel value of 0 in the other areas. However, this is not restrictive as long as the areas where objects are distinguished from the other areas. A silhouette image may be an image expressed by two pixel values other than 255 and 0, or an image expressed by three or more pixel values.

The silhouette images may be generated by using a common technique such as background subtraction, where background images captured in advance without an object before start of the game are subtracted from the captured images including objects. However, the method for generating the silhouette images is not limited thereto. For example, object areas may be extracted by using an object (human body) recognition method.

The camera information obtaining unit 2120 may obtain foreground images extracted by the cameras 2002 and generate the silhouette images of the objects from the foreground images. In such a case, the camera information obtaining unit 2120 can generate the silhouette images by deleting texture information from the foreground images. Alternatively, the camera information obtaining unit 2120 may obtain silhouette images themselves extracted by the cameras 2002.

Next, the shape estimation unit 2130 estimate the three-dimensional shapes of the objects by repeating steps S2550 to S2590 until all the voxels in the shape estimation region 300 are processed. The three-dimensional shapes are estimated, for example, by using a volume intersection method. Other common methods may be used for estimation. The voxel size for shape estimation may be set in advance by the user using a GUI, or set by using a text file.

In step S2550, the shape estimation unit 2130 determines whether a voxel of interest is included in a calculation region (first region 330) based on the coordinates of the voxel. In a case where the voxel of interest is included in the first region 330 (YES in step S2550), the processing proceeds to step S2560. On the other hand, in a case where the voxel of interest is not included in the first region 330, i.e., is included in the second region 320 (NO in step S2550), the processing proceeds to step S2570.

The foregoing processing may be replaced with processing for determining whether there is shape estimation information associated with the voxel of interest. In a case where such shape estimation information is determined to exist (YES in step S2550), the processing proceeds to step S2560. In a case where no such shape estimation information is determined to exist (NO in step S2550), the processing proceeds to step S2570.

In step S2560, the shape estimation unit 2130 obtains the shape estimation information about the voxel of interest, generated in step S2530.

In step S2570, the shape estimation unit 2130 obtains the shape estimation information set in step S2520 since the voxel of interest is included in the second region 320.

In step S2580, the shape estimation unit 2130 determines whether the voxel of interest is part of the shape of an object (voxel deletion determination) based on the shape estimation information obtained in step S2560 or S2570. The shape estimation unit 2130 initially scans the bits of the shape estimation information obtained in step S2560 or S2570 and identifies cameras 2002 corresponding to digits indicating a value of 1 as the cameras 2002 to be used for the voxel deletion determination. The shape estimation unit 2130 then obtains silhouette images corresponding to the identified cameras 2002 among the plurality of silhouette images obtained in step S2540. The shape estimation unit 2130 also obtains camera parameters corresponding to the identified cameras 2002 among the camera parameters of the plurality of cameras 2002 obtained in step S2500. In this sense, the shape estimation information can be said to be information indicating the cameras (imaging apparatuses) 2002 to be used to determine whether to delete an element.

Next, the shape estimation unit 2130 determines whether to delete the voxel of interest, based on the silhouette images and the camera parameters corresponding to the identified cameras 2002. Specifically, the shape estimation unit 2130 converts the three-dimensional coordinates of the representative point (for example, center) of the voxel of interest into coordinates in the silhouette images of the respective cameras 2002 by using the camera parameters, and obtains the pixel values of the silhouette images at the converted coordinates. In a case where the pixel values are 255, the coordinates corresponding to the voxel of interest is included in the areas representing an object in the silhouette images. In a case where the pixel values at the coordinates into which the coordinates of the voxel of interest are converted are 255 in all the silhouette images corresponding to the identified cameras 2002, the shape estimation unit 2130 determines that the voxel of interest is part of the shape of an object, and determines to not delete the voxel. Meanwhile, in a case where there is any silhouette image where the pixel value at the converted coordinates is 0, the shape estimation unit 2130 determines that the voxel of interest is not part of the shape of an object.

The shape estimation unit 2130 may determine that the voxel of interest is not part of the shape of an object in a case where the number of silhouette images where the pixel value at the converted coordinates is 0 is greater than or equal to a threshold. The threshold may be a given value such as 2 and 3. For example, in a case where the threshold is 2 and the number of silhouette images where the pixel value at the converted coordinates is 0 is one, the voxel of interest is determined to be part of the shape of an object and will not be deleted. This can reduce voxels erroneously deleted due to a change of the camera parameters over time.

In step S2590, the shape estimation unit 2130 checks whether all the voxels have been processed. In a case where all the voxels have not been processed (NO in step S2590), the processing returns to step S2550. The shape estimation unit 2130 performs the processing of steps S2550 to S2590 on the next voxel. In a case where all the voxels have been processed (YES in step S2590), the processing proceeds to step S2595. In step S2595, the shape estimation unit 2130 outputs the voxels determined to be part of the shape of an object to the image generation apparatus 3 as three-dimensional shape data.

The image generation apparatus 2003 generates a virtual viewpoint image based on the input three-dimensional shape data, the foreground images (or captured images) of the plurality of cameras 2002, the camera parameters of the cameras 2002, and the virtual viewpoint information. The generated virtual viewpoint image is output to the display apparatus 2004. A method for generating the virtual viewpoint image will be described. The image generation apparatus 2003 performs processing for generating a foreground virtual viewpoint image (virtual viewpoint image of object areas) and processing for generating a background virtual viewpoint image (virtual viewpoint image of other than the object areas). The image generation apparatus 2003 then generates a virtual viewpoint image by overlaying the generated foreground virtual viewpoint image on the background virtual viewpoint image. The generated virtual viewpoint image is transmitted to the display apparatus 2004 and output to a not-illustrated display device such as a display.

The foreground and background virtual viewpoint images are generated as described above in the first exemplary embodiment. The cameras 2002 to be subjected to the visibility determination of voxels constituting three-dimensional shapes may be all the plurality of cameras 2002, or may be limited based on the shape estimation information obtained in step S2560 or S2570. The limitation can reduce the processing time for generating the virtual viewpoint image.

According to the third exemplary embodiment, a wide shape estimation region is divided into a region where shape estimation information is generated element by element and a region where shape estimation information common to elements is set. This can reduce the load of generating the shape estimation information. In addition, the processing load of the shape estimation processing on the wide space (shape estimation region) can also be reduced by performing shape estimation while limiting the cameras, using the shape estimation information.

Figure 12:
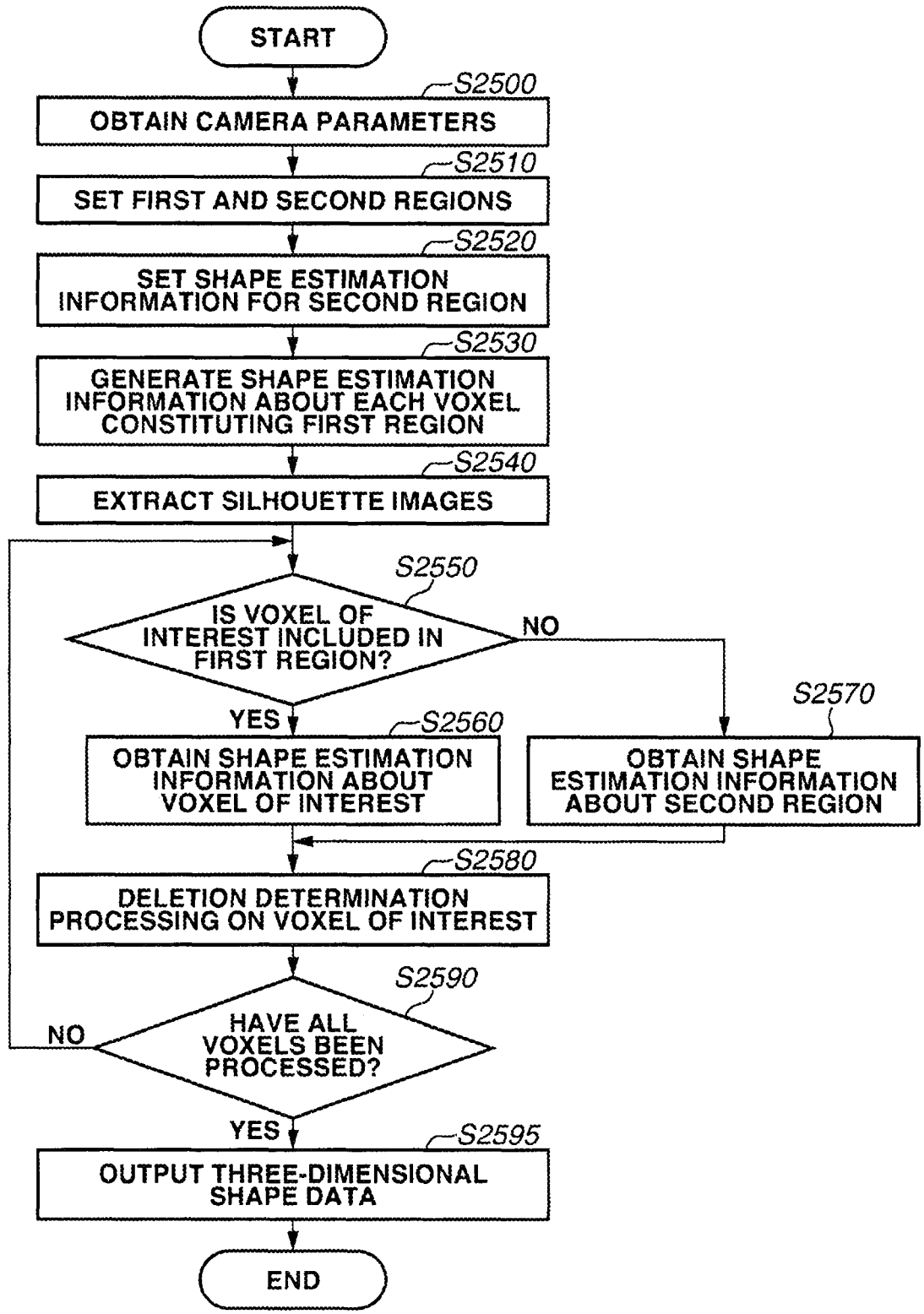
FIG. 12 is a flowchart illustrating an example of processing performed by a shape estimation apparatus.

There is a condition to perform hierarchical shape estimation using a spatial multiresolution representation, such as an octal tree, in step S2550 of the operation flow performed by the shape estimation apparatus 2001 in FIG. 12. The condition is that the voxel of interest have a size smaller than or equal to the size of the voxel used in generating the shape estimation information. Step S2550 is effective as long as this condition is satisfied. Specifically, in a case where the voxel of interest has a size smaller than the size of the voxel used in generating the shape estimation information and the determination in step S2550 is yes, then in step S2560, the shape estimation unit 2130 can obtain the shape estimation information about one level higher.

Meanwhile, in a case where the foregoing condition is not satisfied, there is a plurality of voxels used in generating the shape estimation information corresponding to the voxel of interest, and which piece of shape estimation information to obtain in step S2560 is not uniquely determinable. In addition, the plurality of candidate voxels can include one(s) included in the second region 320. In performing hierarchical shape estimation by using a multiresolution representation, the processing of steps S2550 to S2580 is therefore performed in a case where the foregoing condition is satisfied. In a case where the condition is not satisfied, the voxel deletion determination can be performed by simply using all the cameras 2002.

Fourth Exemplary Embodiment

The present exemplary embodiment describes a case where first and second regions are linked with priority information about cameras, and the shapes of objects are estimated by using shape estimation information and the priority information.

[Configuration]

Figure 13:
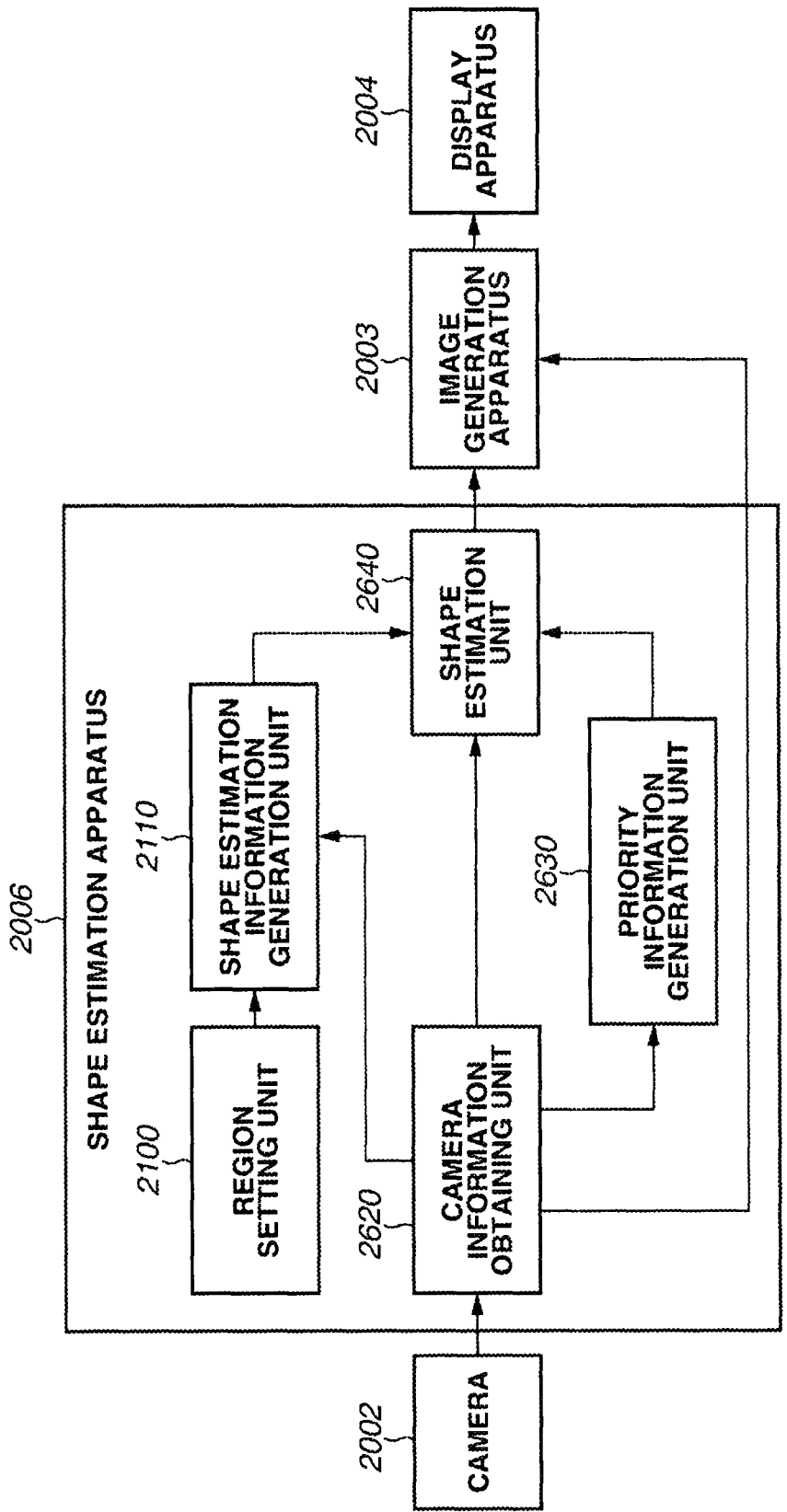
FIG. 13 is a diagram illustrating an example of an apparatus configuration of an image processing system.

A shape estimation apparatus 2006 used in an image processing system according to the present exemplary embodiment will be described with reference to the drawings. FIG. 13 is a diagram illustrating the image processing system including the shape estimation apparatus 2006. As illustrated in FIG. 13, the shape estimation apparatus 2006 is connected to cameras 2002, an image generation apparatus 2003, and a display apparatus 2004. The cameras 2002, the image generation apparatus 2003, and the display apparatus 2004 have a similar configuration to that in the third exemplary embodiment. A redundant description of similar components to those in the third exemplary embodiment will hereinafter be omitted. The shape estimation apparatus 2006 has a similar hardware configuration to that illustrated in FIG. 2.

The shape estimation apparatus 2006 includes a region setting unit 2100, a shape estimation information generation unit 2110, a camera information obtaining unit 2620, a priority information generation unit 2630, and a shape estimation unit 2640. Major differences from the third exemplary embodiment are that the priority information generation unit 2630 is added to the third exemplary embodiment, and the function and operation of the shape estimation unit 2640.

Figure 14:
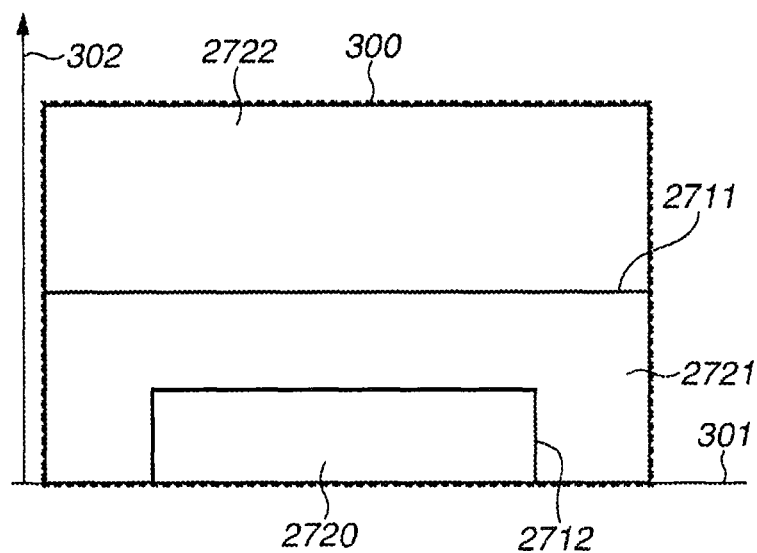
FIG. 14 is a schematic diagram illustrating a first region, a second region, and a third region.

The region setting unit 2100 is similar to that of the third exemplary embodiment. In the present exemplary embodiment, a case where there is a plurality of pieces of border information will be described as an example. Based on the border information, the region setting unit 2100 divides a shape estimation region 300 into three as illustrated in FIG. 14. The border information includes a piece of information including only height information, and a piece of information representing a rectangular solid. A border 2711 is set by the border information including only height information. A border 2712 is set by the border information representing a rectangular solid. The region setting unit 2100 sets the divided three regions as a first region 2720, a second region 2722, and a third region 2721. Which region is set as which of the first to third regions may be freely determined.

The shape estimation information generation unit 2110 generates shape estimation information for the first region 2720 and the third region 2721 by the same calculation method as in the second exemplary embodiment. The shape estimation information generation unit 2110 sets predetermined shape estimation information for the second region 2722.

The priority information generation unit 2630 generates information indicating the priority of each of the plurality of cameras 2002. The priority information is determined by the focal lengths of the cameras 2002. For example, a telescopic camera having a focal length set to 70 mm or more can capture a large image of an object and is thus given high priority. A standard camera having a focal length of 35 mm or more and less than 70 mm is given intermediate priority. A wide angle camera having a focal length of less than 35 mm is given low priority. The focal lengths may be changed by changing a lens configuration. The priority may be determined by other methods. The angles of view may be used instead of the focal lengths. Specifically, cameras 2002 having an angle of view greater than or equal to a predetermined angle of view may be given high priority, and cameras 2002 having an angle of view smaller than the predetermined angle of view may be given low priority.

The priority information is expressed by as many bit strings as the number of levels of priority. Each bit string includes bits as many as or more than the number of plurality of cameras 2002. For example, in a case where the number of cameras 2002 is 32, the priority information is expressed as 32-bit information. With three levels of priority (high, intermediate, and low), the priority information is expressed by three 32-bit values. FIG. 15 illustrates an example of the priority information. In this example, the cameras 2002 having camera numbers 0 to 7 and 16 to 23 have high priority, the cameras 2002 having camera numbers 24 to 31 intermediate priority, and the cameras 2002 having camera numbers 8 to 15 low priority. The lower the bit digit, the lower the camera number. Specifically, pieces of information about the cameras 2002 having camera numbers 0 to 31 are illustrated in order from the right.

Like the camera information obtaining unit 2120 according to the third exemplary embodiment, the camera information obtaining unit 2620 obtains the captured images captured by the plurality of cameras 2002 and the camera parameters of the plurality of cameras 2002.

The shape estimation unit 2640 estimates the three-dimensional shapes of objects based on the plurality of captured images, the plurality of camera parameters, the shape estimation information, and the priority information. In a case where the camera information obtaining unit 2620 obtains foreground images or silhouette images, the shape estimation unit 2640 may estimate the three-dimensional shapes of the objects by using the foreground images or silhouette images instead of the captured images.

[Operation Flow]

Processing of the shape estimation apparatus 2006 will be described with reference to the flowchart illustrated in FIG. 16. Steps having the same numbers as in the flowchart of FIG. 12 are similar to those of the third exemplary embodiment. A redundant description thereof will thus be omitted.

In step S2910, the region setting unit 2100 divides the shape estimation region 300 into a plurality of regions and sets first to third regions based on the border information. To change cameras 2002 to be used for the shape estimation of the ball above and ones to be used for the shape estimation of the objects on the ground, the border information includes a piece of border information indicating only height information of z=2 m. For example, in soccer, important scenes such as a goal scene are expected to occur in a specific area such as in front of the goalposts. The border information thus further includes a piece of border information representing the specific area, such as a rectangular solid, to perform shape estimation in the specific area with particularly high accuracy. The border information representing a rectangular solid is expressed by the coordinates of eight vertices. Such pieces of border information may be stored in the auxiliary storage device 514, and the region setting unit 2100 may read the border information from the auxiliary storage device 514. The region setting unit 2100 may set the border information based on information input by the user using a GUI.

In step S2930, the shape estimation information generation unit 2110 generates shape estimation information about each of the voxels constituting the first region 2720 and the third region 2721. The calculation method is the same as in step S2530. A redundant description thereof will thus be omitted.

In step S2935, the priority information generation unit 2630 generates priority information based on the focal lengths of the cameras 2002. The information about the focal lengths of the cameras 2002 is included in the camera parameters obtained by the camera information obtaining unit 2620. The priority information generation unit 2630 assigns the priority information to the first region 2720, the second region 2722, and the third region 2721. Specifically, the priority information generation unit 2630 assigns both the priority information indicating high priority and the priority information indicating intermediate priority to the first region 2720 and the third region 2721. The priority information generation unit 2630 further assigns the priority information indicating low priority to the second region 2722. Such assignment can limit the use of wide angle cameras having low resolution for shape estimation in the regions near the ground where the players play.

Step S2540 is similar to that of the third exemplary embodiment. A description thereof will thus be omitted. Next, the shape estimation unit 2640 estimates the three-dimensional shapes of objects by repeating steps S2950 to S2590 until all the voxels in the shape estimation region 300 are processed. While the shape estimation method is similar to that of the third exemplary embodiment, there is a difference in that the cameras 2002 used for shape estimation are further limited. The priority information generated in step S2935 is used to limit the cameras 2002.

In step S2950, the shape estimation unit 2640 determines whether a voxel of interest is included in a calculation region (first region 2720 or third region 2721) based on the coordinates of the voxel. In a case where the voxel of interest is included in the first region 2720 or the third region 2721 (YES in step S2950), the processing proceeds to step S2960. Meanwhile, in a case where the voxel of interest is not included in either of the first and third regions 2720 and 2721, i.e., is included in the second region 2722 (NO in step S2950), the processing proceeds to step S2970.

The operation flow in the case where the voxel of interest is included in the first region 2720 or the third region 2721 (steps S2960 to S2963) will be described. This operation flow is intended for voxel deletion determination, and the cameras 2002 used for the voxel deletion determination are limited based not only on the shape estimation information but also on the priority information.

In step S2960, the shape estimation unit 2640 obtains the shape estimation information about the voxel of interest, generated in step S2930.

In step S2961, the shape estimation unit 2640 obtains the priority information assigned to the first region 2720 or the third region 2721 including the voxel of interest in step S2935. As the priority information, the information about the cameras 2002 having high priority and the information about the cameras 2002 having intermediate priority are assigned to the first and third regions 2720 and 2721.

In step S2962, the shape estimation unit 2640 initially ORs the information about the cameras 2002 having high priority and the information about the cameras 2002 having intermediate priority bit by bit. The shape estimation unit 2640 further ANDs the ORed information and the shape estimation information bit by bit. The shape estimation unit 2640 then identifies cameras 202 corresponding to bit values of 1 in the ANDed information as ones to be used for the voxel deletion determination. The voxel deletion determination using the identified cameras 2002 is performed as in step S2580. Here, the threshold used in the processing of step S2580 is set to 2.

Step S2963 is processing to be performed in a case where the voxel of interest is not deleted in step S2962 and is included in the first region 2720. In other words, in a case where the voxel of interest is deleted in step S2962 or in a case where the voxel of interest is included in the third region 2721, step S2963 is skipped. In step S2963, the shape estimation unit 2640 further performs voxel deletion determination on the voxel of interest determined to be left undeleted in step S2962 by using only the information indicating the cameras 2002 having high priority as the priority information. This enables more accurate deletion determination on voxels left undeleted in step S2962 by using only telescopic cameras having high resolution. More specifically, the shape estimation unit 2640 initially ANDs the information about the cameras 2002 having high priority and the shape estimation information bit by bit. The shape estimation unit 2640 then identifies cameras 2002 corresponding to bit values of 1 in the ANDed information. The shape estimation unit 2640 performs voxel deletion determination by using the identified cameras 2002. The voxel deletion determination using the identified cameras 2002 is performed as in step S2580. The voxel deletion determination can be performed with higher accuracy by setting the threshold used in the processing of step S2580 to a value smaller than the value used in step S2963, such as 1.

Now, the operation flow in the case where the voxel of interest is not included in the first region 2720 or the third region 2721 (steps S2970 to S2972) will be described. Like the processing of steps S2960 to S2962, the cameras 2002 to be used for voxel deletion determination are limited based not only on the shape estimation information but on the priority information.

In step S2970, the shape estimation unit 2640 obtains the shape estimation information set in step S2520 since the voxel of interest is included in the second region 2722.

In step S2971, the shape estimation unit 2640 obtains the priority information assigned to the second region 2722 including the voxel of interest in step S2935. The priority information assigned to the second region 2722 is the information about the cameras 2002 having low priority.

In step S2972, the shape estimation unit 2640 initially ANDs the information about the cameras 2002 having low priority and the shape estimation information bit by bit. The shape estimation unit 2640 then identifies cameras 2002 corresponding to bit values of 1 in the ANDed information. The shape estimation unit 2640 performs voxel deletion determination by using the identified cameras 2002. The voxel deletion determination using the identified cameras 2002 is performed as in step S2580. Here, the threshold used in the processing of step S2580 is set to 2. This allows the voxel deletion determination to be performed only for wide angle cameras having angles of view including the object in mid-air, to accelerate the shape estimation.

The subsequent processing is the same as in the third exemplary embodiment.

According to the fourth exemplary embodiment, the shapes of objects can be estimated by referring to both the shape estimation information and the focal length-based priority information added to the shape estimation information. A region or regions to estimate shapes with particularly high accuracy by using high-resolution lenses can be set in such a manner.

It will be understood that the selection of cameras (imaging apparatuses) in the shape estimation processing described in the third and fourth exemplary embodiments can be applied to the shape estimation processing according to the first and second exemplary embodiments. For example, in steps S605 and S606 of FIG. 6, imaging apparatuses may be selected by using the shape estimation information and priority information as described in the third and fourth exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2019-172189, filed Sep. 20, 2019 and No. 2019-172190, filed Sep. 20, 2019, which are hereby incorporated by reference herein in their entirety.

What is claimed is:

1. An information processing apparatus comprising:
one or more memories storing instructions; and
one or more processors executing the instructions to:
generate shape data on an object included in a first partial space by obtaining, from first elements constituting the first partial space, elements which have determined to be a part of the object included in the first partial space based on one or more captured images obtained from a first imaging apparatus group composed of one or more of a plurality of imaging apparatuses and the first parameter associated with the first partial space, the first partial space being included in an imaging space which is an image capturing target for the plurality of imaging apparatuses; and
generate shape data on an object included in a second partial space by obtaining, from second elements constituting the second partial space, elements which have been determined to be a part of the object included in the second partial space based on one or more captured images obtained from a second imaging apparatus group composed of one or more, other than the first imaging apparatus group, of the plurality of imaging apparatuses and a second parameter associated with the second partial space, the second partial space being included in the imaging space,
wherein the first partial space and the second partial space do not overlap each other in the imaging space, and the first parameter and the second parameter are different from each other,
the first parameter includes information indicating up to how many captured images to be determined an element constituting the imaging space is not part of shape of the object included in the first partial space are allowed, and
the second parameter includes information indicating up to how many captured images to be determined an element constituting the imaging space is not part of shape of the object included in the second partial space are allowed.

2. The information processing apparatus according to claim 1, wherein the first parameter includes information indicating whether a region corresponding to each of the first elements constituting the first partial space is included in an angle of view of the respective plurality of imaging apparatuses.

3. The information processing apparatus according to claim 1, wherein the second parameter includes information indicating an imaging apparatus having an angle of view including a region corresponding to each of the second elements.

4. The information processing apparatus according to claim 1, wherein the second parameter includes information indicating an imaging apparatus to be used to generate the shape data on the object included in the second partial space.

5. The information processing apparatus according to claim 1,
wherein the first parameter is determined for each of the first elements constituting the first partial space among elements constituting the imaging space, and
wherein information common to the second elements constituting the second partial space among the elements constituting the imaging space is determined as the second parameter.

6. The information processing apparatus according to claim 1, wherein one or more imaging apparatuses included in the first imaging apparatus group include(s) an imaging apparatus having an angle of view different from an angle(s) of view of one or more imaging apparatuses included in the second imaging apparatus group.

7. The information processing apparatus according to claim 1, wherein a number of imaging apparatuses composing the second imaging apparatus group is less than a number of imaging apparatuses composing the first imaging apparatus group.

8. The information processing apparatus according to claim 1, wherein the object expected to be included in the first partial space and the object expected to be included in the second partial space differ in at least either size or a motion characteristic.

9. The information processing apparatus according to claim 1, wherein a number of objects expected to be included in the first partial space is different from a number of objects included in the second partial space.

10. The information processing apparatus according to claim 1,
wherein a subject of image capturing by the plurality of imaging apparatuses is a game played by using a ball, and
wherein objects expected to be included in the second partial space include the ball.

11. The information processing apparatus according to claim 1,
wherein a subject of imaging by the plurality of imaging apparatuses is a game played by using a ball, and
wherein objects expected to be included in the first partial space include at least either a person playing the game or the ball.

12. The information processing apparatus according to claim 1, wherein the shape data on the object is generated based on image data generated based on the one or more captured images, the image data indicating a region of the object in the one or more captured images.

13. The information processing apparatus according to claim 1, wherein the imaging space is divided into the plurality of partial spaces including the first and second partial spaces based on information indicating a border.

14. The information processing apparatus according to claim 13, wherein the information indicating the border includes information indicating a height in the imaging space.

15. The information processing apparatus according to claim 1, wherein
shape data of the object in the first partial space is generated based on one or more foreground images obtained by applying first separation processing to one or more captured images obtained from the first imaging apparatus group, and
shape data of the object in the second partial space is generated based on one or more foreground images obtained by applying second separation processing different from the first separation processing to one or more captured images obtained from the second imaging apparatus group.

16. The information processing apparatus according to claim 15, wherein the first separation processing uses a background subtraction, and the second separation processing uses a frame subtraction.

17. A shape data generation method comprising:
generating shape data on an object included in a first partial space by obtaining, from first elements constituting the first partial space, elements which have determined to be a part of the object included in the first partial space based on one or more captured images obtained from a first imaging apparatus group composed of one or more of a plurality of imaging apparatuses and a first parameter associated with the first partial space, the first partial space being included in an imaging space which is an image capturing target for the plurality of imaging apparatuses; and
generating shape data on an object included in a second partial space by obtaining, from second elements constituting the second partial space, elements which have been determined to be a part of the object included in the second partial space based on one or more captured images obtained from a second imaging apparatus group composed of one or more, other than the first imaging apparatus group, of the plurality of imaging apparatuses and a second parameter associated with the second partial space, the second partial space being included in the imaging space,
wherein the first partial space and the second partial space do not overlap each other in the imaging space and the first parameter and the second parameter are different from each other,
the first parameter includes information indicating up to how many captured images to be determined an element constituting the imaging space is not part of shape of the object included in the first partial space are allowed, and
the second parameter includes information indicating up to how many captured images to be determined an element constituting the imaging space is not part of shape of the object included in the second partial space are allowed.

18. A non-transitory computer-readable storage medium storing a computer program for causing a computer to perform a shape data generation method, the shape data generation method comprising:
generating shape data on an object included in a first partial space by obtaining, from first elements constituting the first partial space, elements which have determined to be a part of the object included in the first partial space based on one or more captured images obtained from a first imaging apparatus group composed of one or more of a plurality of imaging apparatuses and a first parameter associated with the first partial space, the first partial space being included in an imaging space which is an image capturing target for the plurality of imaging apparatuses; and
generating shape data on an object included in a second partial space by obtaining, from second elements constituting the second partial space, elements which have been determined to be a part of the object included in the second partial space based on one or more captured images obtained from a second imaging apparatus group composed of one or more, other than the first imaging apparatus group, of the plurality of imaging apparatuses and a second parameter associated with the second partial space, the second partial space being included in the imaging space
wherein the first partial space and the second partial space do not overlap each other in the imaging space and the first parameter and the second parameter are different from each other,
the first parameter includes information indicating up to how many captured images to be determined an element constituting the imaging space is not part of shape of the object included in the first partial space are allowed, and
the second parameter includes information indicating up to how many captured images to be determined an element constituting the imaging space is not part of shape of the object included in the second partial space are allowed.

* * * * *